United States Patent
Xu et al.

(10) Patent No.: US 7,680,024 B2
(45) Date of Patent: Mar. 16, 2010

(54) MULTILEVEL READ-ONLY OPTICAL DISK AND METHOD FOR PRODUCING THE SAME

(75) Inventors: Duanyi Xu, Beijing (CN); Jianmin Liu, Beijing (CN); Hao Wang, Beijing (CN); Da Lu, Beijing (CN); Longfa Pan, Beijing (CN); Yi Ni, Beijing (CN); Ken Chen, Beijing (CN); Jianping Xiong, Beijing (CA); Dalin Wu, Beijing (CN); Jing Pei, Beijing (CN); Jianshe Ma, Beijing (CN); Xiaohui Lu, Beijing (CN); Chenyu Su, Beijing (CN)

(73) Assignee: Shanghai Xiangzhang Electronics Co., Ltd., Songjiang, Shanghai (CN)

( * ) Notice: Subject to any disclaimer, the term of this patent is extended or adjusted under 35 U.S.C. 154(b) by 1273 days.

(21) Appl. No.: 11/102,567

(22) Filed: Apr. 8, 2005

(65) Prior Publication Data

US 2006/0203706 A1    Sep. 14, 2006

(30) Foreign Application Priority Data

Mar. 8, 2005   (CN)  ......................... 2005 1 0053509
Mar. 8, 2005   (CN)  ......................... 2005 1 0053536

(51) Int. Cl.
*G11B 7/24* (2006.01)
(52) U.S. Cl. ................................... 369/275.4
(58) Field of Classification Search .............. 369/275.4, 369/275.3, 275.2, 275.1; 428/64.1; 430/321
See application file for complete search history.

(56) References Cited

U.S. PATENT DOCUMENTS 4,310,916 A * 1/1982 Dil ......................... 369/109.02

(Continued)

FOREIGN PATENT DOCUMENTS

JP          6111485 A        4/1994

(Continued)

OTHER PUBLICATIONS

Kadokawa, Y., et al., "Multi-level optical recording using a blue laser," *Optical Data Storage, Proc. SPIE*, 5069: 369-374 (2003).

(Continued)

*Primary Examiner*—Tan X Dinh
(74) *Attorney, Agent, or Firm*—Perkins Coie LLP

(57) ABSTRACT

The present invention provides a multilevel read-only optical disk and the method for producing the same. The multilevel read-only optical disk comprises a plurality of the recording pits, each of the longitudinal sections of the recording pits has a multilevel arbitrary shape; the areas of the longitudinal sections of the recording pits are not identical each other; the area of each of the longitudinal sections of the recording pits is defined by the following formula: $S=\int h(x)dx$, where S represents the area of each of the longitudinal sections of the recording pits, x represents the coordinate value along the width direction of the recording pits, h(x) represents the pit-depth distribution function of the longitudinal sections of the recording pits and the region of the integration covers the whole longitudinal sections of the recording pits. Furthermore, the run length of the multilevel read-only optical disk is limited. The present invention obtains the advantage of both multilevel storage technology and run length limited (RLL) codes. They can improve prominently the storage capacity and data transfer rate of read-only optical disk without changing the wavelength of the laser and optical numerical aperture, and are most compatible with the conventional read-only optical disk system.

26 Claims, 16 Drawing Sheets

U.S. PATENT DOCUMENTS

| | | | | |
|---|---|---|---|---|
| 4,325,135 | A * | 4/1982 | Dil et al. | 369/109.02 |
| 4,896,313 | A * | 1/1990 | Hirose et al. | 369/275.4 |
| 4,956,214 | A * | 9/1990 | Imataki et al. | 428/64.4 |
| 5,331,623 | A * | 7/1994 | Matoba et al. | 369/44.26 |
| 5,337,301 | A * | 8/1994 | Sugiura et al. | 369/110.02 |
| 5,339,304 | A * | 8/1994 | Hanaoka | 369/109.02 |
| 5,357,499 | A * | 10/1994 | Nomoto | 369/120 |
| 5,359,591 | A * | 10/1994 | Nomoto | 369/275.4 |
| 5,459,712 | A * | 10/1995 | Sugaya et al. | 369/275.4 |
| 5,467,339 | A * | 11/1995 | Nakajima et al. | 369/275.4 |
| 5,559,787 | A * | 9/1996 | Nomoto | 369/112.02 |
| 5,617,389 | A * | 4/1997 | Satoh et al. | 369/44.42 |
| 5,717,682 | A * | 2/1998 | Nomoto | 369/275.4 |
| 5,896,366 | A * | 4/1999 | Ogawa | 369/275.4 |
| 5,946,288 | A * | 8/1999 | Ogawa | 369/275.4 |
| 6,567,367 | B2 * | 5/2003 | Ohno et al. | 369/116 |
| 6,771,570 | B1 * | 8/2004 | Wong et al. | 369/30.1 |
| 6,800,348 | B2 * | 10/2004 | Takemoto et al. | 428/64.4 |
| 6,810,004 | B1 * | 10/2004 | Sako | 369/275.4 |
| 6,826,143 | B1 * | 11/2004 | Kermani | 369/275.1 |
| 7,038,992 | B1 * | 5/2006 | Hori | 369/59.25 |
| 7,283,459 | B2 * | 10/2007 | Ootera | 369/275.4 |
| 7,539,121 | B2 * | 5/2009 | Tomiyama et al. | 369/275.4 |

FOREIGN PATENT DOCUMENTS

| | | |
|---|---|---|
| JP | 6124450A A | 5/1994 |
| JP | 62043839 A | 5/1994 |
| WO | WO 97/35304 | 3/1997 |

OTHER PUBLICATIONS

Spielman, S., et al., "Using pit-depth modulation to increase capacity and data transfer rate in optical discs," *Optical Data Storage, Proc. SPIE*, 3109:98-104 (1997).

Wu, K., et al., "Further results on recording of multi-level run-length-limited modulation signals on phase-change optical discs," *Optical Data Storage Conf. Tech. Dig.*, pp. 115-118 (2004).

Wu, K., et al., "Recording of multi-level run-length-limited (ML-RLL) modulation signals on phase-change optical discs," *Optical Data Storage Conf. Tech. Dig.*, pp. 1-3 (2003).

* cited by examiner

MULTILEVEL READ-ONLY OPTICAL DISK AND METHOD FOR PRODUCING THE SAME

CROSS REFERENCE TO RELATED APPLICATION

This application is based on, and claims priority from, Chinese Patent Application No. 200510053536.0 filed on Mar. 8, 2005 and Chinese Patent Application No. 200510053509.3 filed on Mar. 8, 2005, which are hereby incorporated by reference in their entirety.

TECHNICAL FIELD

The present invention relates in general to digital storage technologies and in particular to a multilevel read-only optical disk and a method for producing the same.

BACKGROUND

Conventional digital optical disk generally records data by converting information into the binary data corresponding to two different physical states of record marks on a storage medium. Such storage method is referred as binary storage method. The current storage technology of read-only optical disk usually employs the binary storage method. A pit or land appeared at a record region on the disk is determined by the intensity of reflective light being low or high. Two states can be recorded in each record cell that corresponds to one bit information.

The multilevel storage technology is developed on the basis of the binary storage technology. If a data stream is modulated into M-ary digits (M>2) which correspond to M kinds of different physical states respectively, the M-level storage will be obtained. In the M-level storage method, $\log_2 M$ bits data can be stored in one record mark (unit). As a result, if M is bigger than 2, one record unit will record the information over one bit and the data transfer rate will be improved at the same time. The multilevel storage technology is a new technology that can prominently improve the storage capacity and data transfer rate without changing the laser wavelength and the optical numerical aperture. Therefore, the multilevel storage system has a good compatibility with the conventional optical storage systems.

An example of basic multilevel read-only optical disk is the solution of Pit-Depth Modulation (PDM). According to the scalar diffraction theory, for read-only disk, the intensity of reflective light corresponds to the depth of record pit on a disk: the intensity of reflective light decreases along with the increment of pit-depth at the beginning of zero, and when pit-depth is a quarter of laser wavelength, the intensity of reflective light becomes minimal value. The multilevel optical storage method can be achieved by setting the different pit-depth considering the relation between pit-depth and the intensity of reflective light. But numerical pit-depth levels may cause many technical problems, such as disk replication and signal detection. Therefore, the improvement of the storage capacity of the read-only disk by only increasing the levels of pit-depth is limited severely.

Conventional modulation coding of multilevel optical storage generally employs the solution of amplitude modulation which does not dig up the potential of the coding technology thoroughly. However, all of the conventional binary storage disk use the run length limited (RLL) modulation coding. RLL means the sequence in the optical storage channel must be constrained: such a constrained sequence must have a least d 'zeros', but at most k 'zeros' between two 'one' in the sequence. Parameters d and k are the minimal and maximal values of run length in data sequence. Because d limits the max value of data transfer rate, it can influence the inter symbol interference (ISI) of the sequence throughout a band limited channel. In the transfer of binary data, signals received are usually expected to be self-synchronizing. The synchronization is achieved by a phase lock loop for regulating the phase at a detecting time in response to the waveform jump received. The maximal run length parameter k ensures a fit jump frequency so as to meet the requirement of reading clock synchronization.

RLL codes can increase the storage capacity relative to the amplitude modulation codes. In the binary storage method using the RLL codes, information over 1 bit can be recorded in a minimal record mark, so RLL codes are widely used in the optical storage technology, such as the EFM code (d=2, k=10) for CD and the EFM+ code (d=2, k=10) for DVD. Since the RLL code is used, the recording density of DVD reaches 1.5 bit per minimums symbol.

In view of the foregoing, it is desired to provide a multilevel read-only optical disk and method for producing the same.

SUMMARY

In order to obviate at least one of the above mentioned technical problems in the conventional technology, the object of the present invention is to provide an storage technology that can improve prominently the storage capacity and data transfer rate of read-only optical disk without changing the wavelength of the laser and optical numerical aperture.

Additional features of the invention will be set forth in the description which follows, and in part will be apparent from the description, or may be learned by practice of the invention.

The present invention provides a multilevel storage technology for making the multilevel read-only optical disk with little level number having high storage capacity.

The present invention provides a multilevel read-only optical disk, comprising a plurality of the recording pits, each of the longitudinal sections of the recording pits has a multilevel arbitrary shape; the areas of the longitudinal sections of the recording pits are not identical to each other; the area of each of the longitudinal sections of the recording pits is defined by the following formula:

$$S = \int h(x)dx$$

where S represents the area of each of the longitudinal sections of the recording pits, x represents the coordinate value along the width direction of the recording pits, h(x) represents the pit-depth distribution function of the longitudinal sections of the recording pits and the region of the integration covers the whole longitudinal sections of the recording pits.

The area S of each of the longitudinal sections of the recording pits is defined by modulating the laser power for making master disk.

In the multilevel read-only optical disk above mentioned, the run lengths of the multilevel read-only optical disk are limited, there are at least d 'zeros' and at most k 'zeros' between two nonzero digits in the channel sequences of the multilevel read-only optical disk, parameter d constrains the minimal value of run lengths occurring in data sequence while parameter k constrains the maximal value of run lengths occurring in data sequence, where k and d are both integers and k is not less than d that is not less than 0 ($k \geq d \geq 0$).

Each of the recording marks may record $\log_2 M$ bits data, where M is the level number of the recording pit and M is an integer that is not less than 2.

In the multilevel read-only optical disk mentioned above, the depths of the recording pits with different level number are different from each other while the widths of the recording pits with different level number are same. As an alternative, the widths of the recording pits with different level number are different while the depths of the recording pits with different level number are same. As another alternative, both widths and depths of the recording pits with different level number are different.

In the multilevel read-only optical disk mentioned above, the depths and/or widths of the recording pits are defined by regulating the laser power for making master disk.

In the multilevel read-only optical disk mentioned above, each of the longitudinal sections of the pits along the width direction has a multistage trapezoidal shape with a fixed height, and the master disk contains a photo resist.

In the multilevel read-only optical disk mentioned above, each of the longitudinal sections of the pits along the width direction has a multistage trapezoidal shape with an unfixed height, and the master disk contains a modified photo resist. The modified photo resist is obtained by treating the conventional photo resist for making master disk with physical modification that can be performed by at least one selected from the group consisting of thermal treatment, optical treatment, electric treatment and magnetic treatment, or chemical modification that can be performed by adding at least one selected from the group consisting of an initiator, a sensibilizer and a resin as an addition.

In the multilevel read-only optical disk mentioned above, each of the longitudinal sections of the pits along the width direction of the recording pits has a multilevel arbitrary shape and the master disk contains a resin.

In the multilevel read-only optical disk mentioned above, the run lengths are limited. There are at least d 'zeros' and at most k 'zeros' between two nonzero digits in the channel sequences of the multilevel read-only optical disk, parameter d constrains the minimal value of run lengths occurring in data sequence while parameter k constrains the maximal value of run lengths occurring in data sequence, where k and d are both integers and k is not less than d that is not less than 0.

The present invention also provides a method for producing a multilevel read-only master disk, comprising the steps of:

a) generating recording signals for controlling the recording of the master disk by encoding binary user data with the error correction codes and the multilevel modulation codes; and b) modulating the laser output power with the recording signals, then recording the master disk, and finally forming the multilevel read-only master disk.

In the above mentioned method, the multilevel read-only optical master disk comprises a plurality of the recording pits, each of the longitudinal sections of the recording pits has a multilevel arbitrary shape; the areas of the longitudinal sections of the recording pits are not identical to each other; the area of each of the longitudinal sections of the recording pits is defined by the following formula:

$$S=\int h(x)dx$$

where S represents the area of each of the longitudinal sections of the recording pits, x represents the coordinate value along the width direction of the recording pits, h(x) represents the pit-depth distribution function of the longitudinal sections of the recording pits and the region of the integration covers the whole longitudinal sections of the recording pits.

In the above mentioned method, the area S of each of the longitudinal sections of the recording pits is defined by modulating the laser power for making master disk; when the laser is a semiconductor laser, the recording laser power is modulated by changing the drive current of the semiconductor laser, and when the laser is a gas laser, the recording laser power is modulated by changing the modulation amplitude of the acousto-optic modulator or the electro-optic modulator.

In the above mentioned method, the multilevel modulation code is a multilevel run-length-limited modulation code; the multilevel code sequence is a multilevel run-length-limited modulation sequence; the multilevel read-only master disk is a multilevel run-length-limited read-only master disk.

In the above mentioned method, the run length is defined by regulating the exposure time for recording the master disk.

In the above mentioned method, when the laser is a semiconductor laser, the exposure time for recording the master disk is regulated by changing the pulse width of the drive current of the semiconductor laser, and when the laser is a gas laser, the exposure time for recording the master disk is regulated by changing the modulation pulse width of the acousto-optic modulator or the electro-optic modulator.

In the above mentioned method, each of the longitudinal sections of the pits along the radial direction has a multistage trapezoidal shape with a fixed height, and the master disk contains a photo resist.

In the above mentioned method, each of the longitudinal sections of the pits along the radial direction has a multistage trapezoidal shape with an unfixed height, and the master disk contains a modified photo resist.

In the above mentioned method, the modified photo resist is used for the master disk. The modified photo resist is formed by treating the conventional photo resist for making master disk with physical modification that can be performed by at least one selected from the group consisting of thermal treatment, optical treatment, electric treatment and magnetic treatment, or chemical modification that can be performed by adding at least one selected from the group consisting of an initiator, a sensibilizer and a resin as an addition.

In the above mentioned method, each of the longitudinal sections of the pits along the radial direction has a multilevel arbitrary shape and the master disk contains a resin.

The present invention further provides a method for producing a multilevel read-only optical disk, which comprises the steps of:

a) generating recording signals for controlling the recording of the master disk by encoding binary user data with the error correction and the multilevel modulation;

b) modulating the laser output power with the recording signals, then recording the master disk, and finally forming the multilevel read-only master disk;

c) replicating a metallic stamper by using the multilevel read-only master disk as a mould; and d) moulding the multilevel read-only optical disk with the metallic stamper.

Comparing with the method for producing a multilevel master disk, the differences between them lie in steps c and d.

In the above mentioned method, the multilevel read-only optical disk comprises a plurality of the recording pits, each of the longitudinal sections of the recording pits has a multilevel arbitrary shape; the areas of the longitudinal sections of the recording pits are not identical to each other; the area of each of the longitudinal sections of the recording pits is defined by the following formula:

$$S=\int h(x)dx$$

where S represents the area of each of the longitudinal sections of the recording pits, x represents the coordinate value along the width direction of the recording pits, h(x) represents the pit-depth distribution function of the longitudinal sections of the recording pits and the region of the integration covers the whole longitudinal sections of the recording pits.

In the above mentioned method, the area S of each of the longitudinal sections of the recording pits is defined by modulating the laser power for making master disk; when the laser is a semiconductor laser, the recording laser power is modulated by changing the drive current of the semiconductor laser, and when the laser is a gas laser, the recording laser power is modulated by changing the modulation amplitude of the acousto-optic modulator or the electro-optic modulator.

In the above mentioned method, the multilevel modulation codes are the multilevel run-length-limited modulation codes; the multilevel codes sequence is a multilevel run-length-limited modulation sequence; the multilevel read-only master disk is the multilevel run-length-limited read-only master disk; the multilevel read-only optical disk is a multilevel run-length-limited read-only optical disk.

In the above mentioned method, the run length is defined by regulating the exposure time for recording the master disk.

In the above mentioned method, when the laser is a semiconductor laser, the exposure time for recording the master disk is regulated by changing the pulse width of the drive current of the semiconductor laser, and when the laser is a gas laser, the exposure time for recording the master disk is regulated by changing the modulation pulse width of the acousto-optic modulator or the electro-optic modulator.

In the above mentioned method, each of the longitudinal sections of the pits along the radial direction has a multistage trapezoidal shape with a fixed height, and the master disk contains a photo resist.

In the above mentioned method, each of the longitudinal sections of the pits along the radial direction has a multistage trapezoidal shape with an unfixed height, and the master disk contains a modified photo resist.

In the above mentioned method, the modified photo resist is used for the master disk. The modified photo resist is formed by treating the conventional photo resist for making master disk with physical modification that can be performed by at least one selected from the group consisting of thermal treatment, optical treatment, electric treatment and magnetic treatment, or chemical modification that can be performed by adding at least one selected from the group consisting of an initiator, a sensitizer and a resin as an addition.

In the above mentioned method, each of the longitudinal sections of the pits along the radial direction has a multilevel arbitrary shape and the master disk contains a resin.

In the multilevel read-only optical disk provided by the present invention, the longitudinal section of the recording pits along the track direction, which are also named as the pit longitudinal section, is one of the following three cases:

1) Multistage shape with a fixed height, which means that the pit depth is fixed while the pit width is not fixed;
2) Multistage shape with an unfixed height, which means that the pit depth and the pit width are both not fixed;
3) Multilevel arbitrary shape, which means that the shape of the longitude section of recording pit is not specific (in other words, the shape of the longitude section of recording pit is random) and the area of the longitudinal sections of the recording pits of the multilevel read-only master disk varies from the difference of level numbers. The area S of pit longitudinal section are defined by the following formula:

$$S=\int h(x)dx$$

where x represents the coordinate value along the width direction of the recording pits, h(x) represents the pit-depth distribution function of the longitudinal sections of the recording pits and the region of the integration covers the whole longitudinal sections of the recording pits.

The multilevel recording pits for the above three cases are obtained by changing the recording laser power for making master disk so as to obtain the multilevel read-only optical disk.

The present invention provides a scheme that RLL code is used in the multilevel read-only optical disk. The scheme can increase the recording density of the multilevel read-only optical disk. For example, the recording density of 4-ary optical disk that employs RLL (d=2, k=8) can reach 2.6 (bit/symbol), which is equal to the recording density of 8-ary optical disk that employs amplitude modulation. Therefore, the use of RLL in the multilevel read-only optical disk can decrease the requirement of the level number of recording pits and be helpful to the replication of read-only disk and detection of the readout signals.

In the multilevel read-only optical master disk provided by the present invention, the pit longitudinal section is one of the following three cases:

1) Multistage shape with a fixed height, which means that the pit depth is fixed while the pit width is not fixed;
2) Multistage shape with an unfixed height, which means that both pit depth and pit width are not fixed;
3) Multilevel arbitrary shape, which means that the shape of the longitude section of recording pit is not specific (in other words, the shape of the longitude section of recording pit is random) and the area of the longitudinal sections of the recording pits of the multilevel read-only master disk varies from the difference of level numbers. The area S of pit longitudinal section are defined by the following formula:

$$S=\int h(x)dx$$

where x represents the coordinate value along the width direction of the recording pits, h(x) represents the pit-depth distribution function of the longitudinal sections of the recording pits and the region of the integration covers the whole longitudinal sections of the recording pits.

In the above cases, the level numbers of the multilevel recording pits are defined by the recording laser power for making master disk.

The methods provided by the present invention include the next steps:

Step 1: generating recording signals for controlling the recoding of the master disk by encoding binary user data with the error correction codes and the multilevel modulation codes;

Step 2: modulating the laser power with the recording signals generated in step 1 and 1) recording on a master disk contains a photo resist and generating a multilevel master disk having a multistage shape with a fixed height; 2) recording on a master disk contains a modified photo resist and generating a multilevel master disk having a multistage shape with an unfixed height; 3) recording on a master disk contains a resin and generating the multilevel master disk having a multilevel arbitrary shape.

The run lengths in all of the cases mentioned above are obtained by regulating the exposure time for recording the master. When the laser is a semiconductor laser, the exposure time for recording the master is regulated by changing the pulse width of the drive current of the semiconductor laser, and when the laser is a gas laser, the exposure time for recording the master is regulated by changing the modulation pulse width of the acousto-optic modulator or the electro-optic modulator;

When the laser is a semiconductor laser, the recording laser power is modulated by changing the drive current of the semiconductor laser, and when the laser is a gas laser, the recording laser power is modulated by changing the modulation amplitude of the acousto-optic modulator or the electro-optic modulator;

Step 3: replicating a metallic stamper by using the master disk obtained in step 2 as a mould;

Step 4: moulding a multilevel RLL read-only optical disk with the metallic stamper obtained in step 3.

In a summary, the present invention provides a new storage technology regarding the multilevel RLL read-only optical disks. The widths and depths of the recording pits of the multilevel read-only optical disks are unfixed. The present invention also provides a multilevel RLL read-only optical disk having multilevel recording pits with the longitudinal section having a arbitrary shape (such as, both width and depth of the section are unfixed, width the section is fixed but depth of the section is unfixed, or both width and depth of the section are fixed) are obtained by changing the recording laser power for mastering.

The present invention further provides the solution in which RLL codes are used in the multilevel read-only optical disks. The solution can further increase the recording density of the multilevel read-only optical disks. For example, the recording density of 4-ary optical disks using RLL (d=2, k=8) can reach 2.6 (bit/symbol), which is equal to the recording density of 8-ary optical disks used in amplitude modulation. Therefore, the multilevel read-only optical disks employing RLL codes can decrease the requirement of the level number of recording pits and be helpful to the replication of read-only disks and detection of the readout signals.

The multilevel read-only optical disk and the method for producing the same provided by the present invention have the advantages of both multilevel storage technology and RLL encoding technology. They can improve prominently the storage capacity and the data transfer rate of read-only optical disks without changing the wavelength of the laser and optical numerical aperture, and are most compatible with the conventional read-only optical disks system. The scheme which employs RLL codes can decrease the requirement of the level number of the multilevel read-only optical disks and be helpful to the replication of read-only disks and detection of the readout signals.

It will be apparent to those skilled in the art, the term "optical disk" should include "son disk" (or optical disk) and "master disk". In the product claims, "optical disk" includes the "son disk" and the "master disk", because the "son disk" and the "master disk" needed to be protected have the same structure. However, in the method claims, the methods for producing "master disk" and "son disk" are different. The "master" should be produced prior to producing "son disk", so the item "optical disk" only represents "son disk" in the method claims.

BRIEF ILLUSTRATION OF DRAWINGS

The accompanying drawings, which are included to provide a further understanding of the invention and are incorporated in and constitute a part of this specification, illustrate embodiments of the invention and together with the description serve to explain the principles of the invention.

PREFERRED EMBODIMENTS

Figure 1:
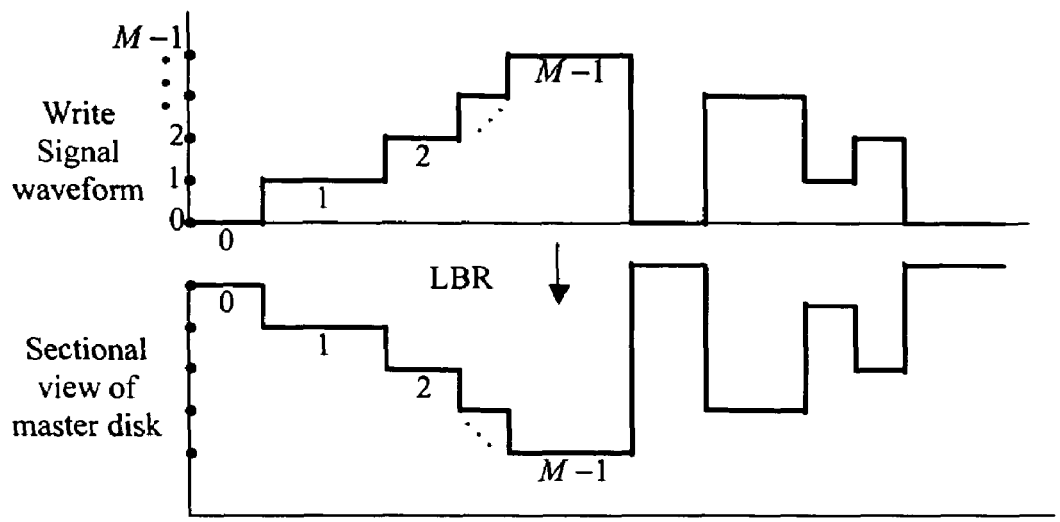
FIG. 1 is a view showing a process for making a multilevel RLL master disk and a sectional view of the master disk.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In the manufacture procedures of optical disk, the master disk is usually made firstly. The method for producing the master disk comprises the steps of: applying a layer of photo resist on the glass master disk (the present invention employs the photo resist Micropsit S1800-4 in Rohm & Haas (UK)); recording information on master using resist master disk producing machine (the present invention employs Π mastering System from NIMBUS (UK)); using Nichia's (Japan) NLHV 500C laser diode to expose the photo resist; then developing the photo resist; finally forming a master disk.

Then, using the sputter station (the present invention employs UNAZIS's Pyramet (Switzerland) sputter station) to sputter a thin layer of metal on the glass substrate (metallization process). After sputtering a thin layer of metal, sputtering a thick layer of metal to form a minus master (metallic stamper), which is used for resin injection and reproduction. The present invention uses Panasonic's DVD production line. An injection moulding machine (Panasonic's DL0004 and DR0004 vertical injection moulding machine) is used to form the disks, and then using UNAXIS's (Switzerland) SWIVEL or CUBLITE sputter stations to sputter the pressed disks. At last, using the metallic stamper to form the disk. Finished line employs Panasonic's (Japan) GRBA-151 system and the on line test instrument employs BASLER's (Germany) S3DVD on-line tester.

Furthermore, in the present invention, master/stamper tester is employed as Audio Dev's (Sweden) DVD Stamper Pro or ST3 Stamper Pro. Disk tester is Pulstec's (Japan) O-PAS 1000 or DDU 1000.

The recording of the multilevel read-only master disks is obtained by changing the laser power. There are two ways to obtain different write laser powers: 1) For a semiconductor laser, changing the driver current of the laser to obtain different output power; 2) For a gas laser, changing the modulation amplitude of the acousto-optic (or electro optic) modulator to obtain different output power. Different laser powers can record different multilevel marks on the following three kinds of materials respectively:

1) the photo resist material, each of the longitude sections of the multilevel recording pits has a multistage trapezoid shape with a fixed height;

2) the modified photo resist material, each of the longitude sections of the multilevel recording pits has a multistage trapezoid shape with an unfixed height; and 3) the resin material, each of the longitude sections of the multilevel recording pits has a multilevel arbitrary shape.

The multilevel recording pits with different run lengths are obtained by controlling the write laser power and adjusting the exposure time simultaneously. Then the recording of multilevel run-length-limited read-only disks is obtained. There are two ways to adjust the exposure time of the write laser: 1) for a semiconductor laser, changing the pulse width of the laser driver current to acquire different exposure time; 2) for a gas laser, changing the modulation pulse width of the acousto-optic (or electro optic) modulator to acquire different exposure time.

An example of the preferred embodiment is illustrated in the drawings.

FIG. 1 is a principle diagram of the present invention, which illustrates the recording procedure of the multilevel RLL master and shows the sectional view of a recorded master disk.

The present invention proposes a specific solution for producing a multilevel read-only master disk: using the one of the following three materials, different multilevel recording pits are recorded by using different recording laser power:

1) the photo resist material, each of the longitude sections of the multilevel recording pits has a multistage trapezoid shape with a fixed height, and has a fixed depth and an unfixed width;

2) the modified photo resist material, each of the longitude sections of the multilevel recording pits has a multistage trapezoid shape with an unfixed height, and has an unfixed depth and an unfixed width; and 3) the resin material, each of the longitude sections of the multilevel recording pits has a multilevel arbitrary shape, the areas of the longitudinal sections with different level numbers are different each other.

Figure 2:
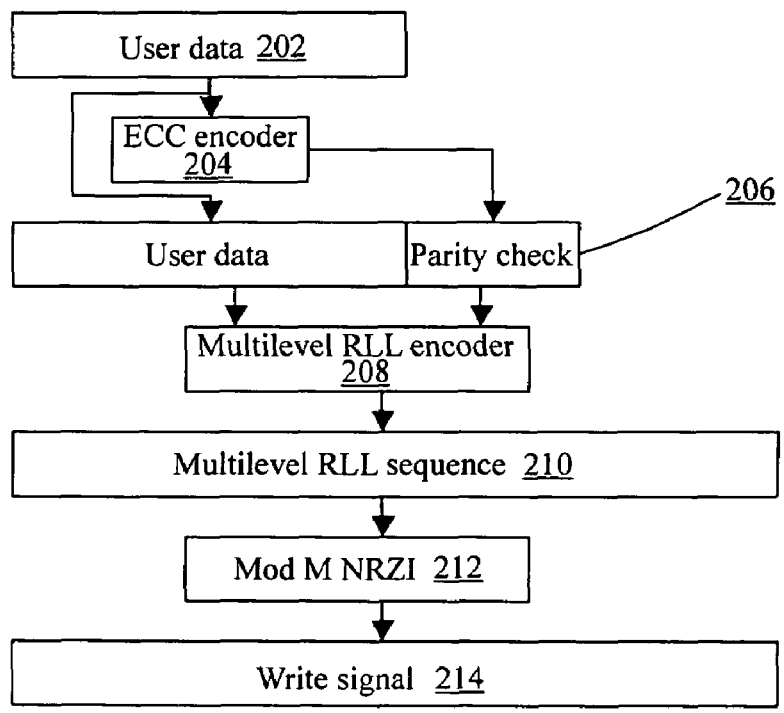
FIG. 2 is a flow chart showing a generating process of the multilevel RLL codes and waveform of the recording signals.
Figure 3A:
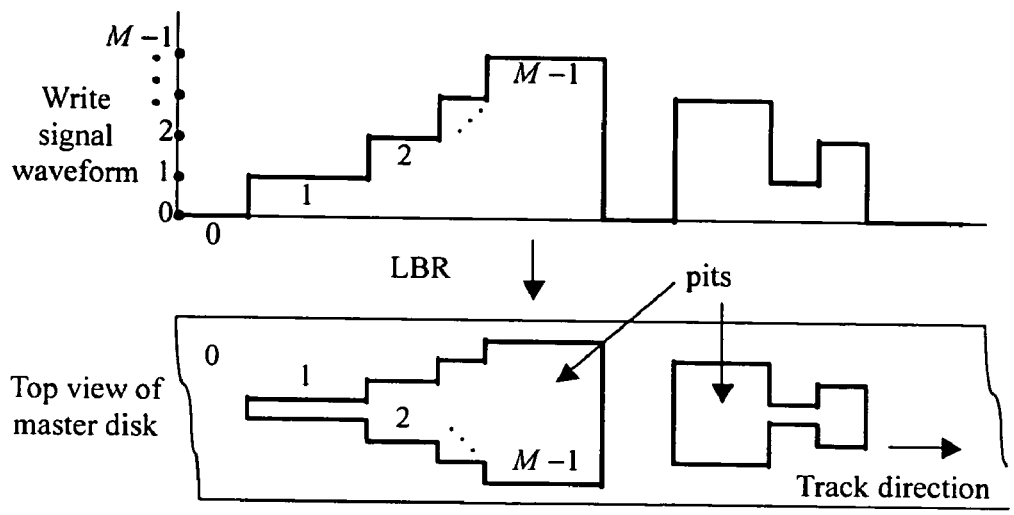
FIG. 3a is a view showing a process for making a multilevel RLL master disk containing a photo resist and a top view of master disk.
Figure 3B:
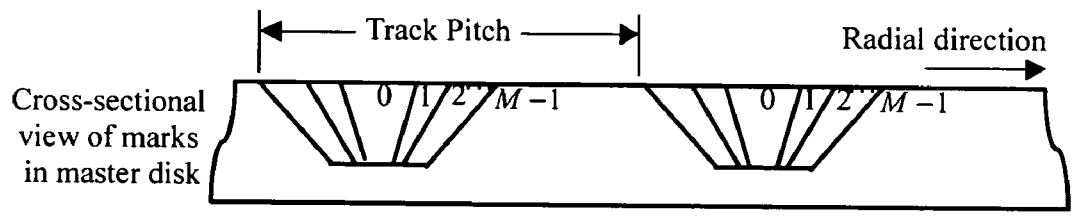
FIG. 3b is a longitudinal (cross) sectional view of master disk shown in FIG. 3a (multistage shape with a fixed height)
Figure 4A:
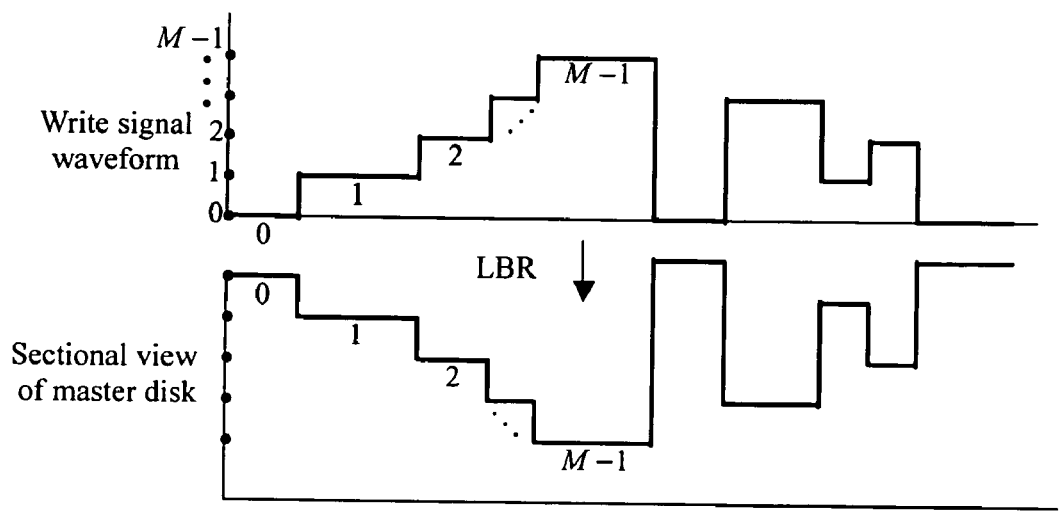
FIG. 4a is a view showing a process for making a multilevel RLL master disk containing a modified photo resist and a sectional view of the master disk.
Figure 4B:
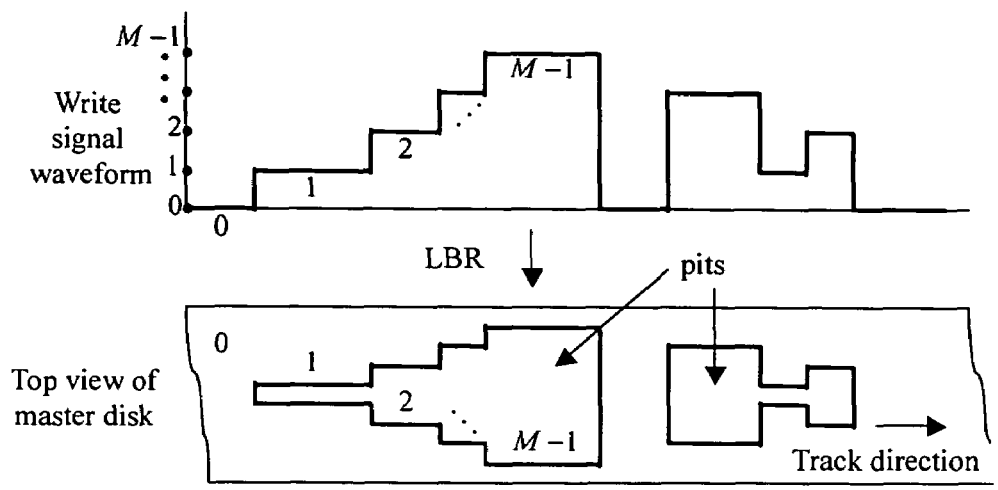
FIG. 4b is a view showing a process for making a multilevel RLL master disk containing a modified photo resist and a top view of master disk.
Figure 4C:
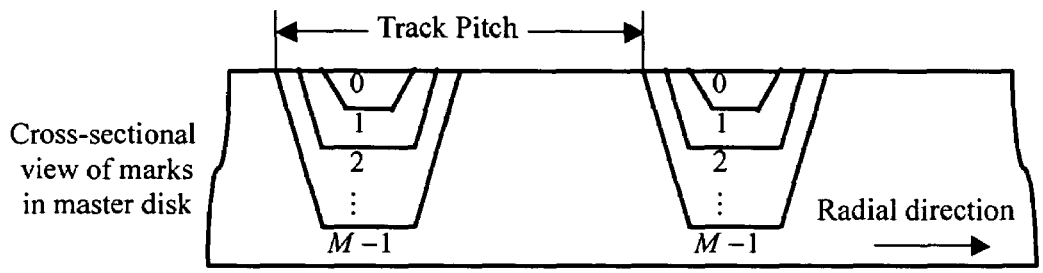
FIG. 4c is a longitudinal (cross) sectional view of the master recording pit (multistage shape with an unfixed height) of the multilevel RLL master disk containing a modified photo resist.
Figure 5A:
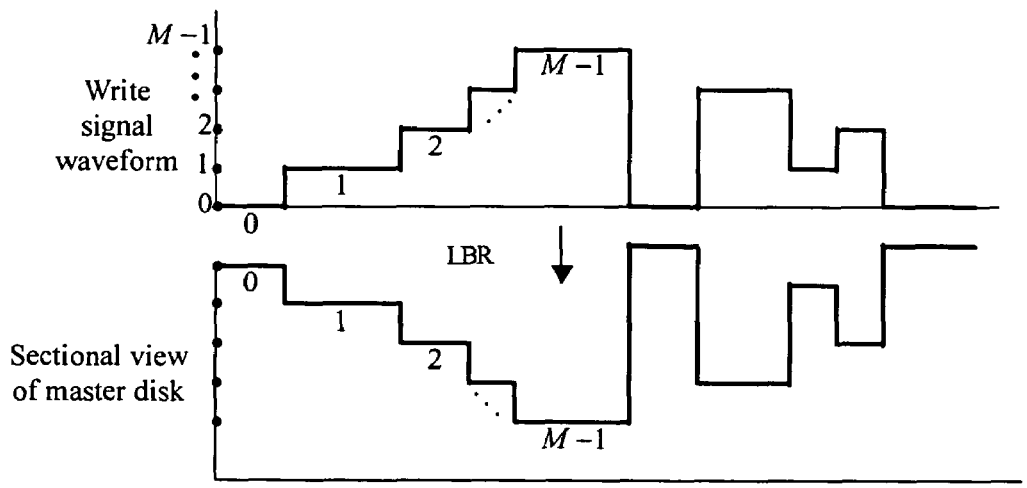
FIG. 5a is a view showing a process for making a multilevel RLL master disk containing a resin and a top view of master disk.
Figure 5B:
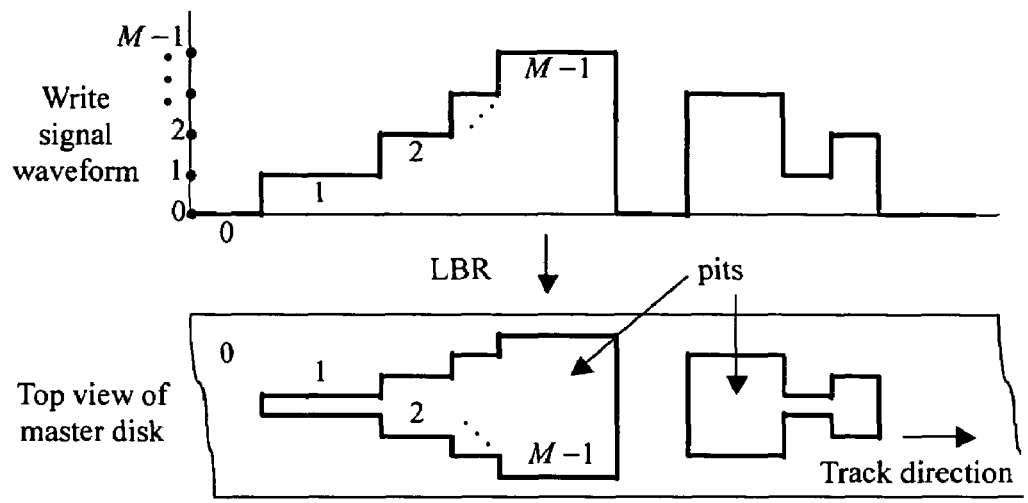
FIG. 5b is a view showing a process for making a multilevel RLL master disk containing a resin and a top view of master disk.
Figure 5C:
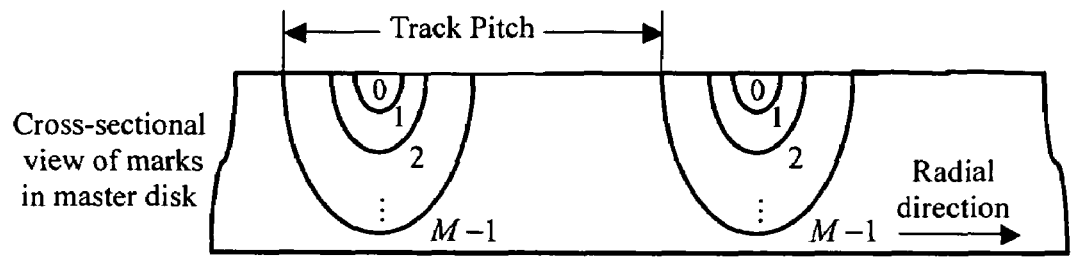
FIG. 5c is a longitudinal (cross) sectional view of the recording pits (the multilevel arbitrary shape) of the multilevel RLL master disk containing a resin.
Figure 6A:
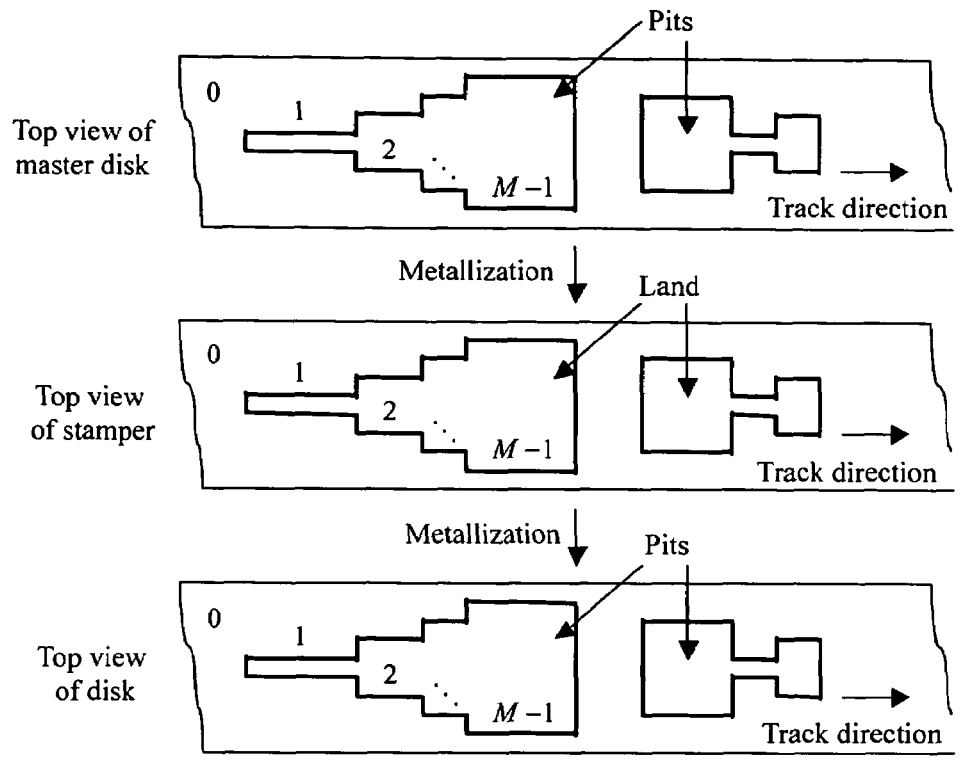
FIG. 6a is a top view showing a replication process of the multilevel RLL read-only optical disk, the master disk of such disk contains a photo resist.
Figure 6B:
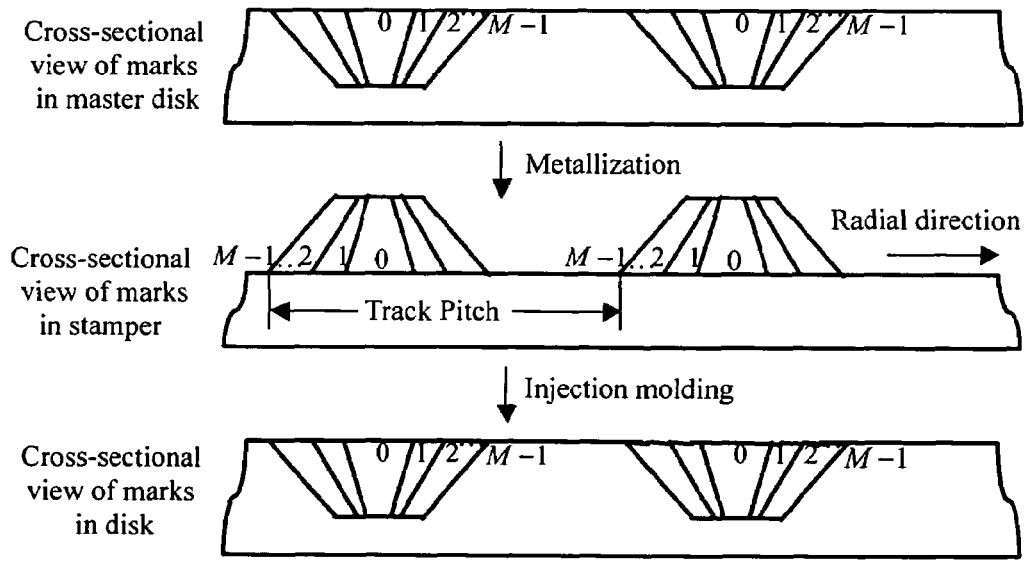
FIG. 6b is a longitudinal (cross) sectional view showing a replication process of the multilevel RLL read-only optical disk, the master disk of such disk contains a photo resist.
Figure 7A:
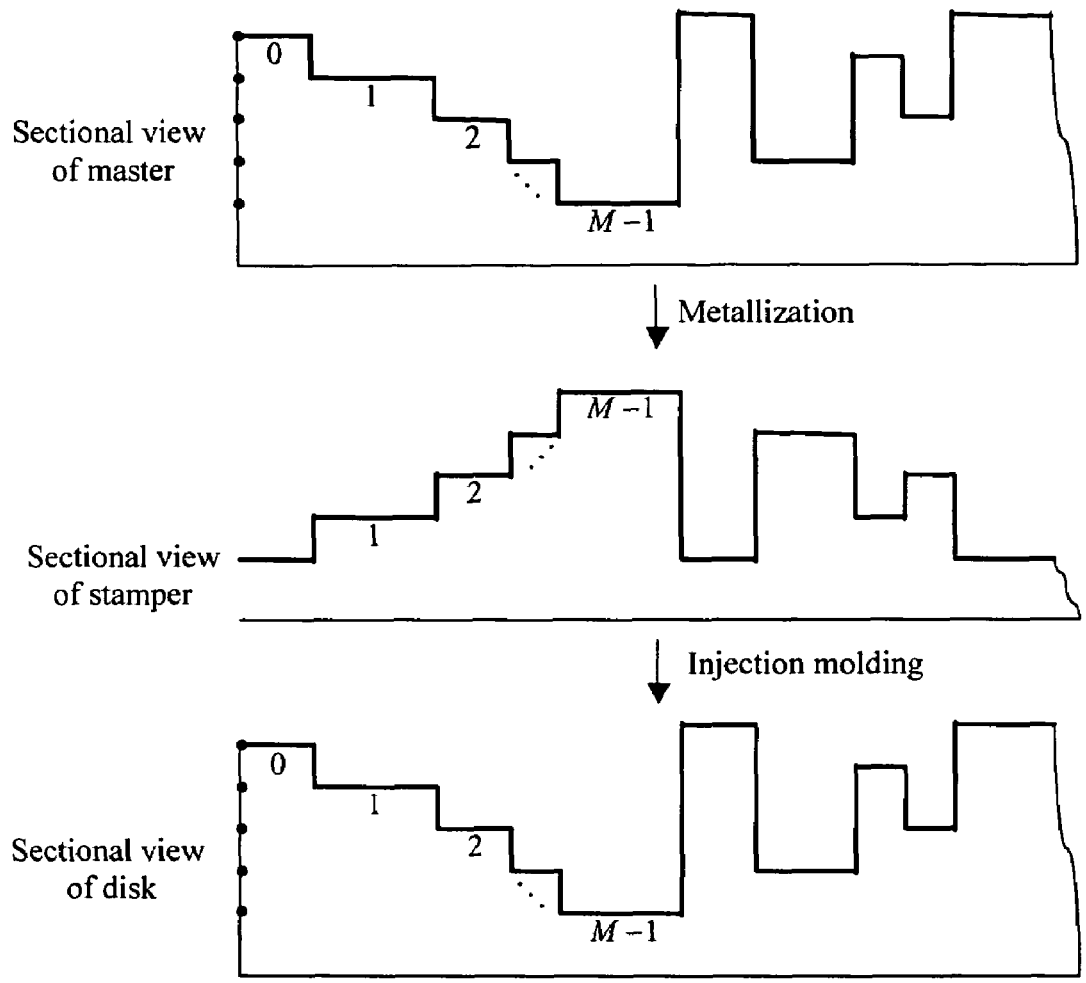
FIG. 7a is a sectional view showing a replication process of multilevel RLL read-only optical disk, the master disk of such disk contains a modified photo resist.
Figure 7B:
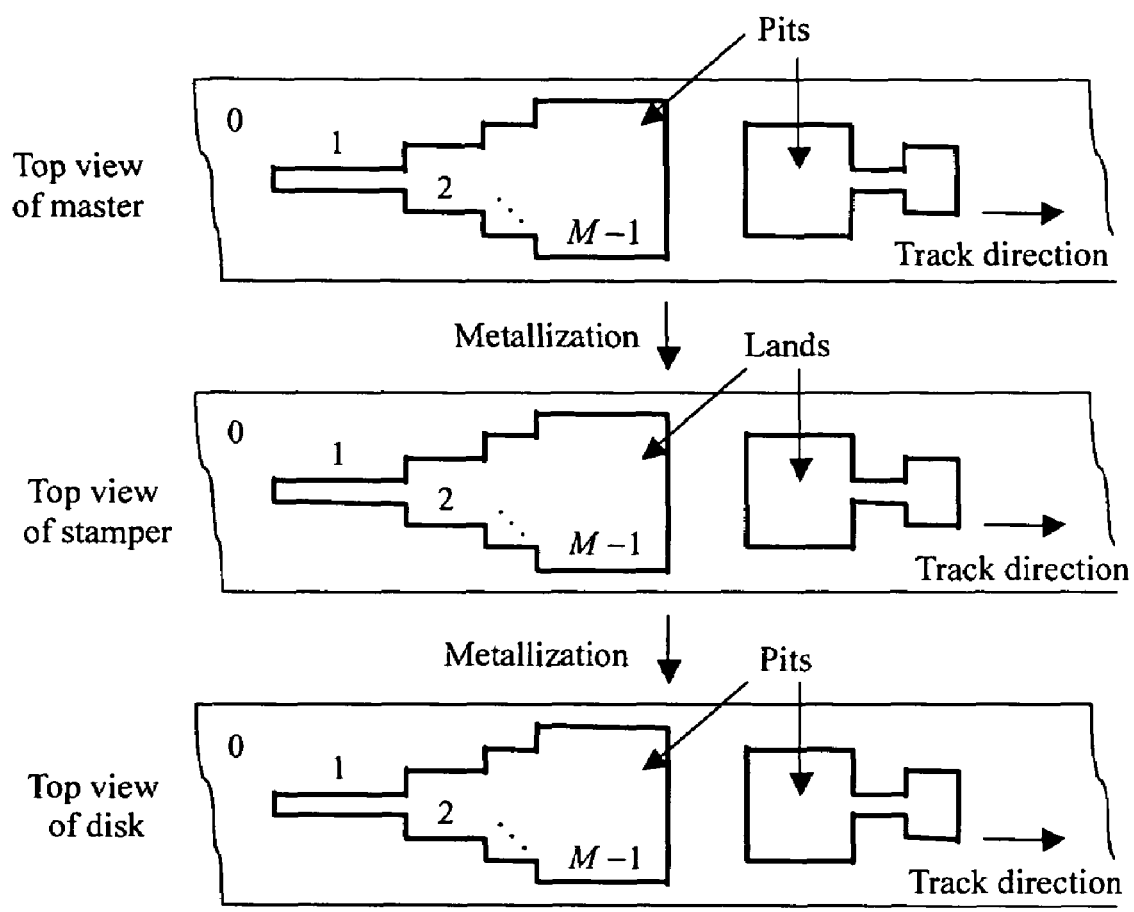
FIG. 7b is a top view showing a replication process of multilevel RLL read-only optical disks, the master disk of such disk contains a modified photo resist.
Figure 7C:
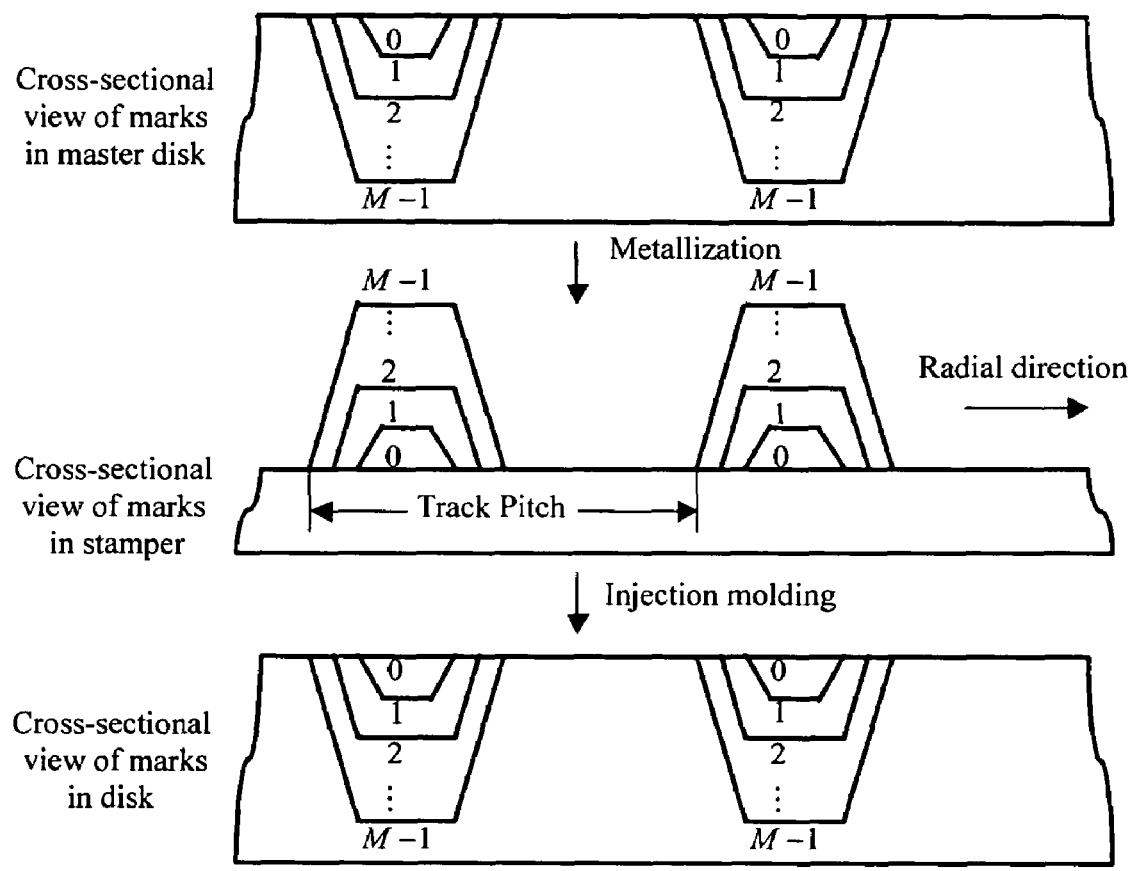
FIG. 7c is a longitudinal (cross) sectional view showing a replication process of multilevel RLL read-only optical disk, the master disk of such disk contains a modified photo resist.
Figure 8A:
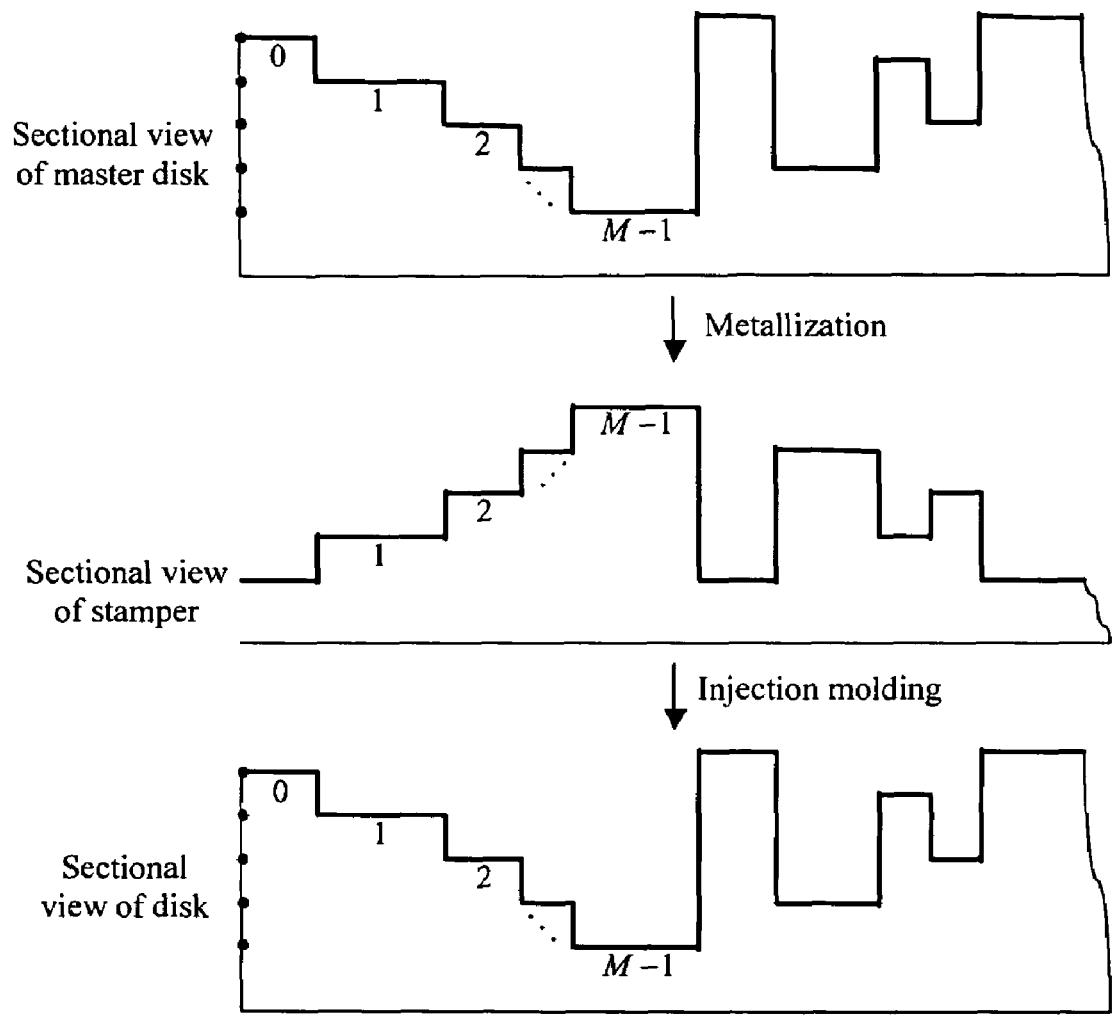
FIG. 8a is a sectional view showing a replication process of the multilevel RLL read-only optical disk, the master disk of such disk contains a resin.
Figure 8B:
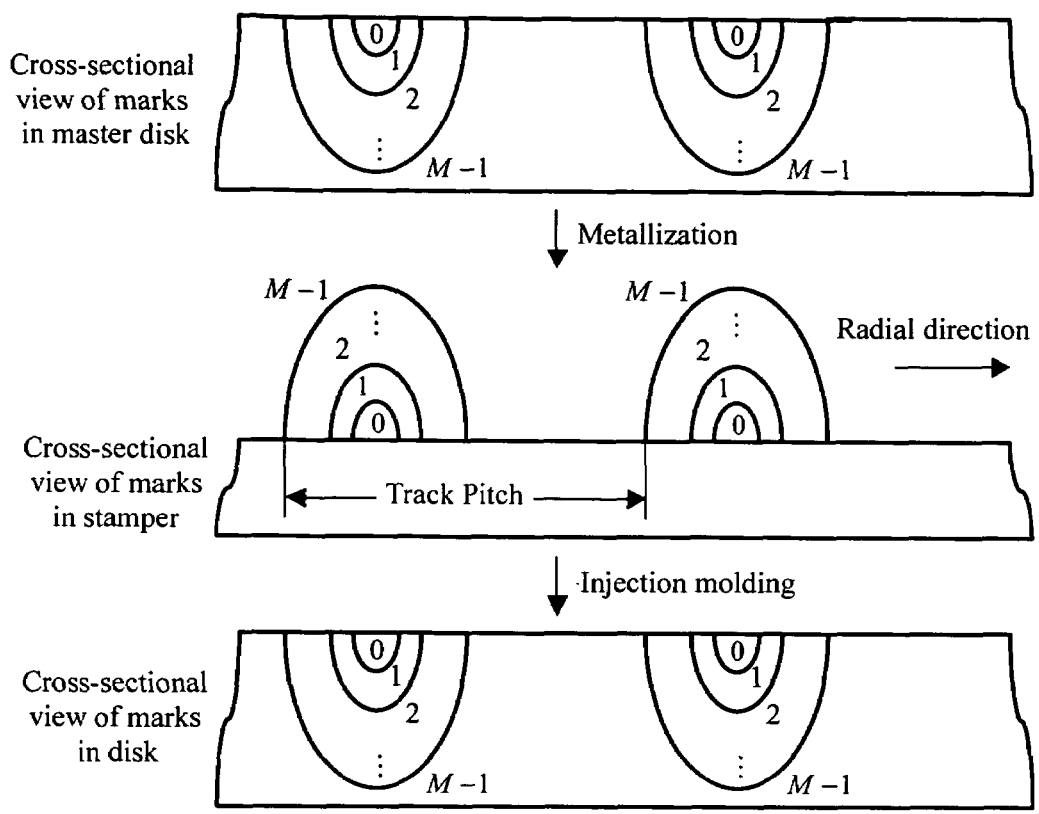
FIG. 8b is a longitudinal (cross) sectional view of the recording pits (any figures) of the multilevel RLL read-only optical disk, the master disk of such disk contains a resin.

FIG. 2 is a flow chart showing a generating process of the multilevel RLL codes and waveform of the recording signals.

The modulation code used in the present invention is a multilevel RLL code. Firstly, a binary user data 202 is inputted into an error correction encoder 204 to generate a binary sequence 206, which consists of the user data and a check code; then the binary sequence 206 is inputted into a multilevel encoder 208 to generate a multilevel (d, k) run-length limited sequence 210, which satisfies the following two constraints: the number of zeros between any two consecutive nonzero digits in the sequence is at least d and at most k. Parameters d and k specify the minimum and maximum possible run-length in the sequence respectively. Finally, after suffering the proceeding of mod M NRZI 212, the sequence 206 is converted into a write signal 214 for controlling the master disk recording.

When employing photo resist materials, master disk recording is performed by applying photochemical effect on the materials. The photo resist materials on the master disk are exposed using the recording laser. After a developing procedure and a photographic fixing procedure, a recording pit is formed in a position where the exposure applied to. The recording laser power is controlled by the amplitude of the write signal waveform. Under the effect of the different laser power, the recording pits corresponding to different level number have a fixed depth and an unfixed width. Photo resist material is commonly employed in the current master recording system, such material is more suitable than the other for the master recording systems.

When employing modified photo resist materials, master disk recording is performed by applying photochemical effect on the materials. The photo resist materials on the master disk will be exposed using the recording laser. After a developing procedure and a photographic fixing procedure, a recording pit is formed in the position where the exposure applied to. For the conventional photo resist materials, the speed of photochemistry reaction is so fast that the photo resist materials in the position where the exposure applied will fully reacted, so that the recording pits have a same depth. However, for the modified photo resist materials, the speed of photochemistry reaction is slow and the depths of the reacted materials vary as the exposure power. Different exposure powers correspond to different recording pits with different depths. The recording laser power is controlled by the write signal, and different laser powers correspond to different level numbers of the recording pits with different depths and widths, which can increase the resolution between the recording pits with different level numbers. It's helpful for the replication of the read-only disks and the detection of the readout signal. Photo resist materials are commonly used in the current master recording systems, so it's easy and suitable to utilize the modified photo resist materials on the current master recording system.

When employing resin materials, master disk recording is performed by applying heat effect on the materials. The resin materials will be gasified by using the recording laser, so as to directly form a recording pit. The recording laser power is controlled by the write signal waveform, and different laser powers correspond to different level numbers of the recording pits with different depths and widths, which can increase the resolution between the recording pits with different level numbers. It's helpful for the replication of the read-only disks and the detection of the readout signal.

While the laser power is controlled by the amplitude of the write signal waveform, the on/off time of the laser or modulator is controlled by the length of the write signal waveform.

Therefore, the multilevel recording pits with different runlength can be obtained. In other words, the amplitude and the length of the write signal waveform control the power and exposure time of the recording laser respectively and finally control the level number and run-length of the recording pits respectively. That is how the recording of the multilevel RLL master can be realized. FIGS. 3a-b, 4a-c and 5a-c illustrate the recording procedure of the multilevel RLL master and show the schematic views of the recorded master.

If the multilevel RLL master disk is produced, it is easy to get its minus master disk (metallic stamper) using resin injection and reproduction as well as metallization. The multilevel RLL read-only disk is reproduced through resin injection using such metallic stamper as a mould. FIGS. 6a-b, 7a-c, and 8a-b show the replication procedure of a multilevel RLL read-only disk.

Figure 9:
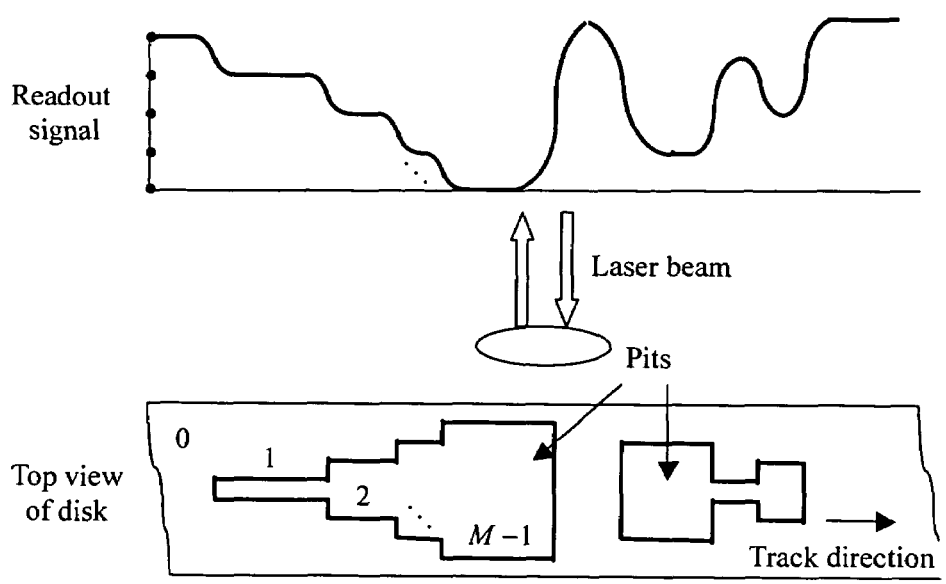
FIG. 9 shows readout waveform of the multilevel RLL read-only optical disk shown in a top view, the master disk of such disk contains a photo resist.
Figure 10:
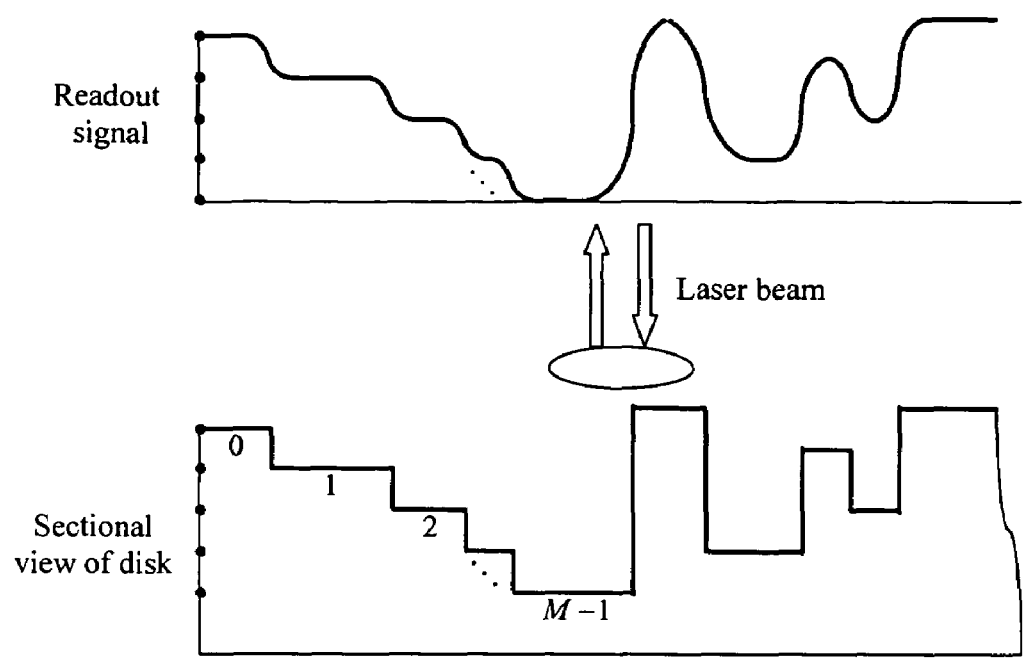
FIG. 10 shows readout waveform of the multilevel RLL read-only optical disk shown in a sectional view, the master disk of such disk contains a photo resist.
Figure 11:
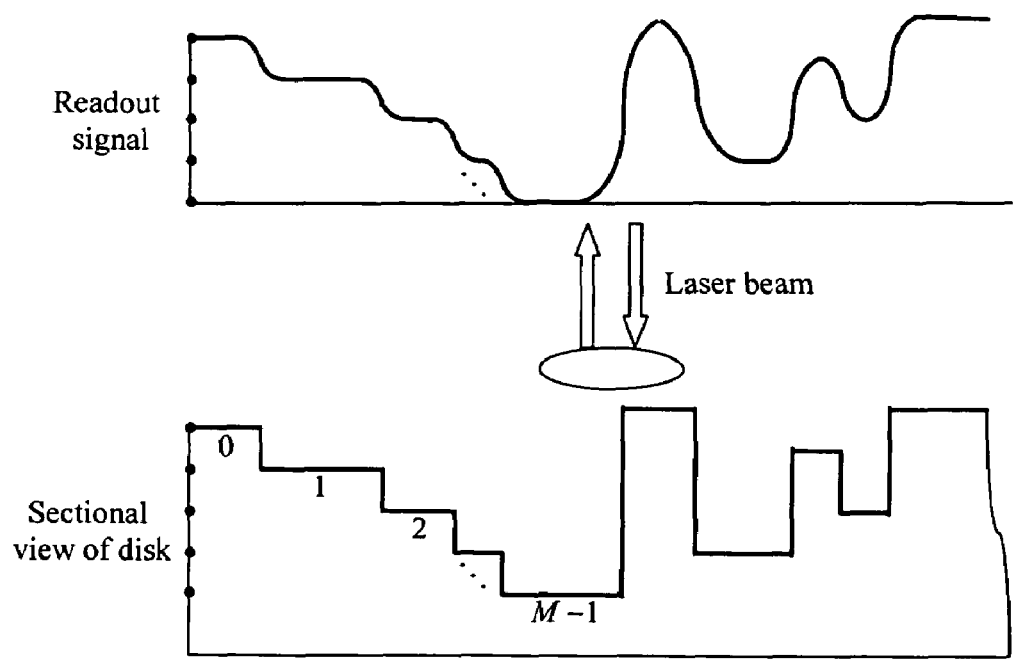
FIG. 11 shows readout waveform of the multilevel RLL read-only optical disk shown in a sectional view, the master disk of such disk contains a resin.

The readout procedure of the multilevel RLL read-only disks is shown in FIGS. 9, 10 and 11. The optical readout system for multilevel RLL read-only optical disks is fully compatible with that of conventional read-only optical disks, so that the conventional optical readout system can be used for the readout of the multilevel RLL read-only optical disks. The readout waveforms of multilevel RLL read-only optical disks are shown in FIGS. 9, 10 and 11. The amplitudes of the readout signal depend on the level number of the recording pits. The light intensity of the reflected light decreases as the increment of the level number of the recording pits, and reaches the minimum at the highest level number. The length of one readout signal with specific amplitude depends on the run length of the recording pits. On the basis of this readout signal, the recorded multilevel (d, k) sequence in FIG. 1 can be recovered by some modular arithmetic.

In the following description, the invention will be described in conjunction with a preferred embodiment, but it should be understood that the invention is not limited by the preferred embodiment.

Figure 12:
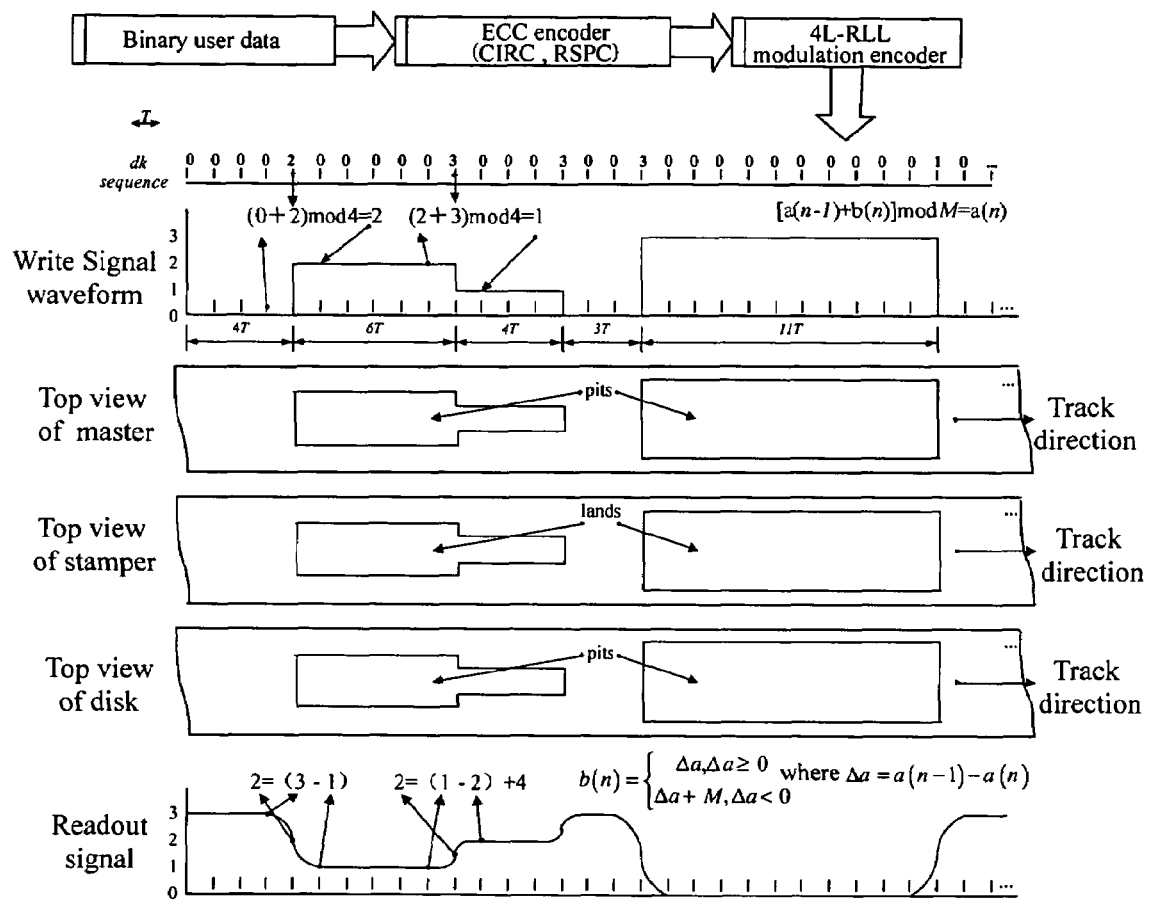
FIG. 12 is a top view showing the embodiments of 4-ary RLL read-only optical disk, the master disk of such disk contains a photo resist.
Figure 13:
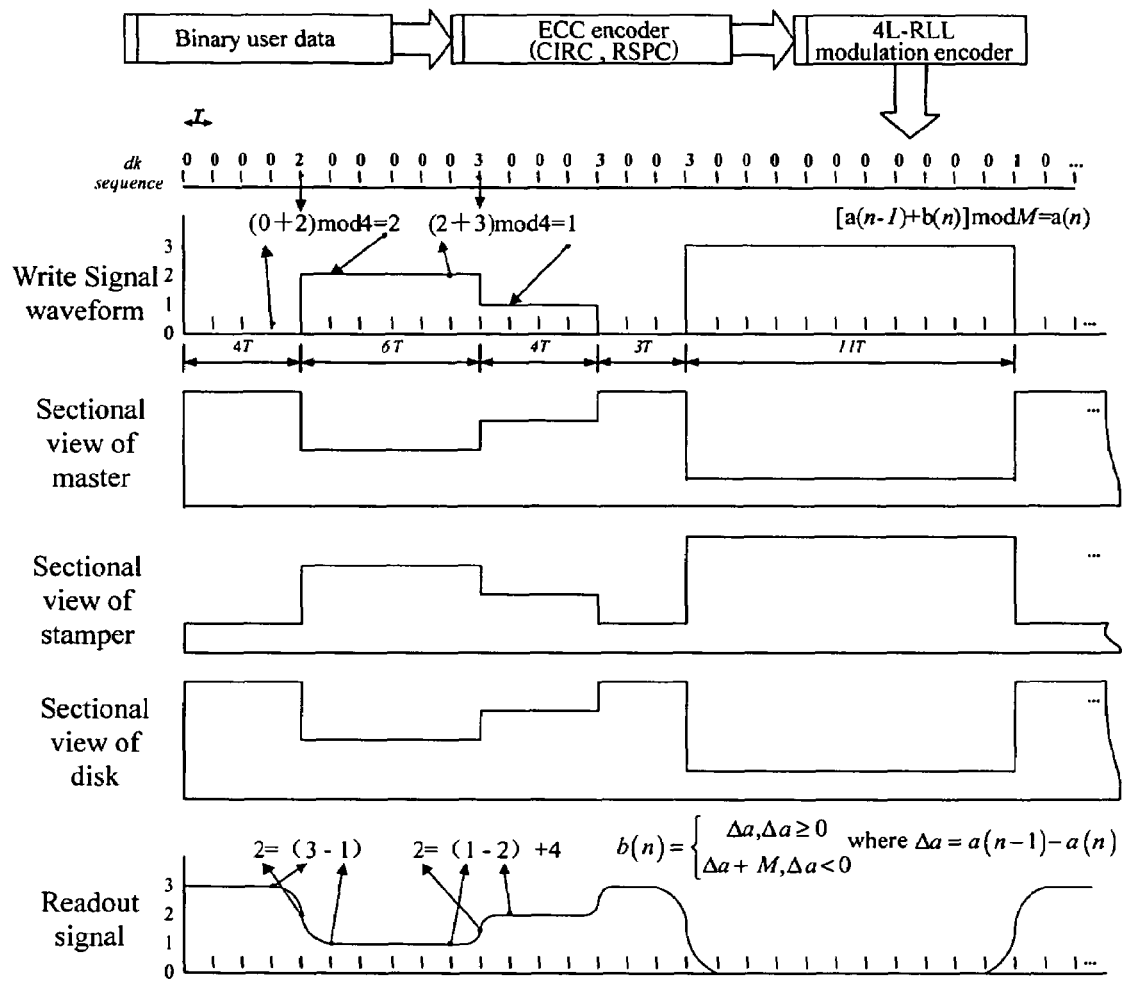
FIG. 13 is a sectional view showing the embodiments of 4-ary RLL read-only optical disk, the master disk of such master contains a modified photo resist.
Figure 14:
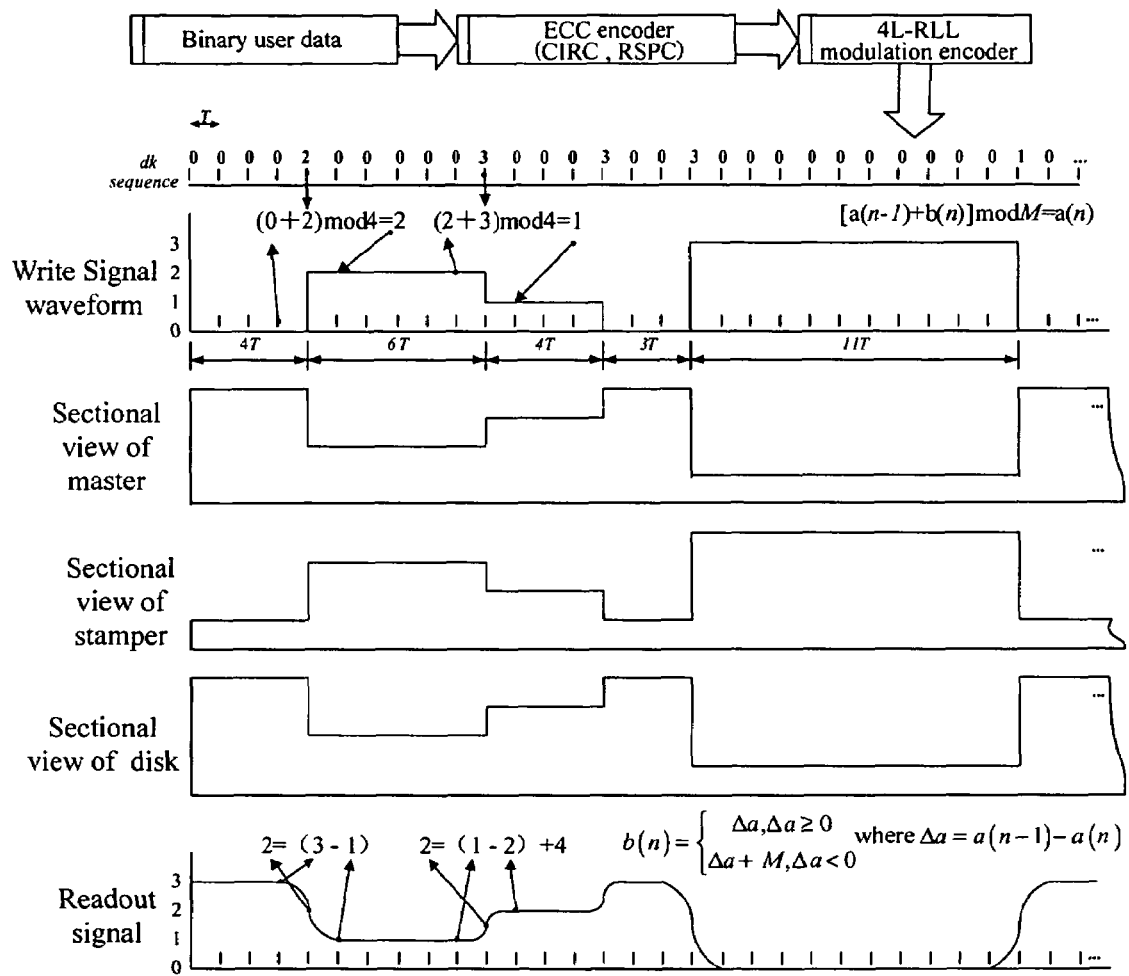
FIG. 14 is a sectional view showing the embodiments of 4-ary RLL read-only optical disk, the master disk of such master contains a resin.

On the basis of the technology of multilevel RLL read-only optical disk provided in the present invention, we design a 4-ary RLL read-only optical disk. FIGS. 12, 13 and 14 show schematic diagrams of this 4-ary RLL read-only optical disk. Firstly, the binary sequence, which is the output of the error correction encoder, is inputted into a 4-ary RLL modulation encoder to generate a 4-ary (d, k) sequence, where d=2, k=10.

Applying the operation of [a(n−1)+b(n)]mod 4=a(n), where a(n) is a write level of the n'th sequence and b(n) is the n'th symbol in the 4-ary RLL sequence, and M is the level number, to the sequence, so as to generate a write signal for controlling the master recording. For example, the fourth write level in the write waveform is a(4)=0, and the fifth symbol in the 4 level sequence is b(5)=2. Then the fifth write level a(5)=2 is derived by the modular arithmetic of (0+2) mod4=2.

Under the controlling of this write signal, write laser may record different multilevel recording pits on the following three kinds of materials:

1) the photo resist material, each of the longitude sections of the multilevel recording pits has a multistage trapezoid shape with a fixed height, and has a fixed depth and an unfixed width;

2) the modified photo resist material, each of the longitude sections of the multilevel recording pits has a multistage trapezoid shape with an unfixed height, and has an unfixed depth and an unfixed width;

3) the resin material, each of the longitude sections of the multilevel recording pits has a multilevel arbitrary shape, the areas of the longitudinal sections with different level numbers are different each other.

Now, referring to FIGS. 12, 13 and 14, it is found that the write signal also controls the run-lengths of the multilevel recording pits. When the 4-ary RLL master is produced, its minus master (metallic stamper) is formed through metallization, for resin injection and reproduction. The 4-ary RLL read-only optical disk is formed through resin injection using such metallic stamper as a mould.

The conventional optical reading system can be used to read the 4-ary RLL read-only optical disk. The amplitudes and the length of the readout signal depend on the level number and the run-length of the marks respectively. On the basis of such readout signal, the recorded multilevel (d, k) sequence can be recovered by the following modular arithmetic.

$$b(n) = \begin{cases} \Delta a, & \Delta a \geq 0 \\ \Delta a + M, & \Delta a < 0 \end{cases}, \text{ where } \Delta a = a(n-1) - a(n)$$

For example, the fourth level in the readout waveform a(4) equals 3, and the fifth level a(5) equals 1, so that b(5) can be derived by the modular arithmetic 2=(3−1), which is the fifth symbol in the (d, k) sequence.

FIGS. 12, 13 and 14 show the full procedures including data generation, master recording, replication and signal readout of the multilevel RLL read-only optical disks.

Figure 15:
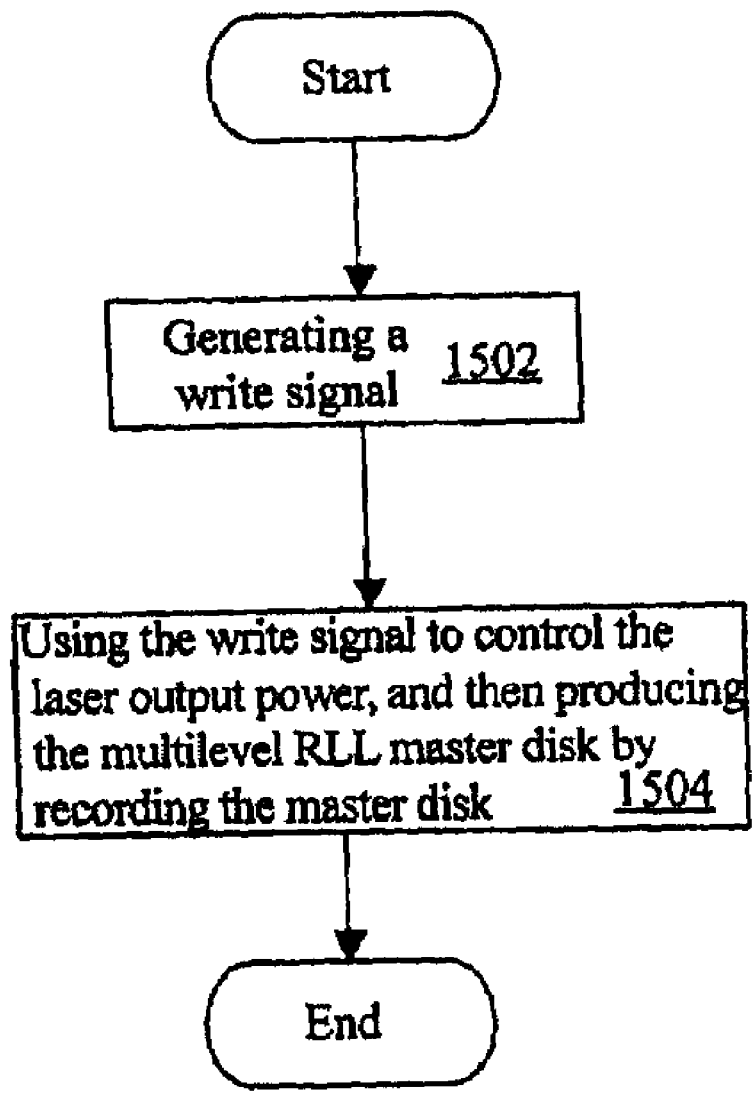
FIG. 15 is a flow chart showing a method for making a master disk in accordance with the present invention.
Figure 16:
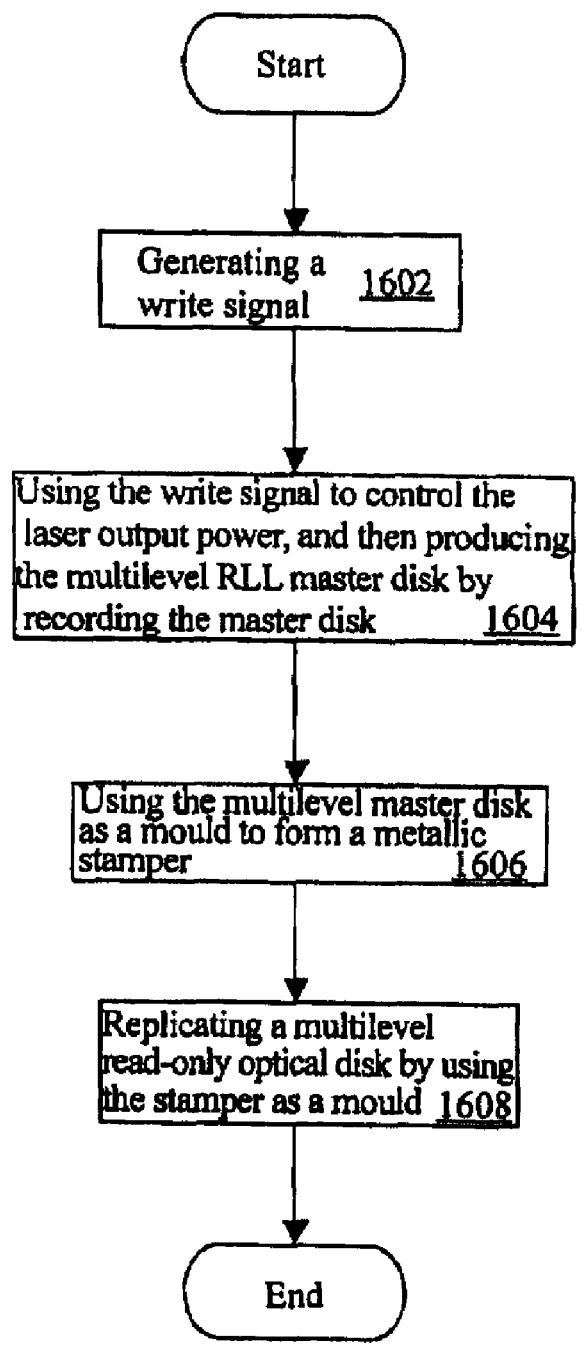
FIG. 16 is the flow chart showing a method for making a multilevel read-only optical disk in accordance with the present invention.

In a summary, the present invention provides methods for producing the multilevel RLL read-only optical disks and the masters, which are shown in FIGS. 15 and 16 respectively.

FIG. 15 shows a block diagram of the method for producing multilevel read-only optical master disk. The method comprises the following steps:

Step 1502, a binary user data is firstly encoded by the ECC encoder and multilevel run-length limited encoder to a multilevel encoding sequence. Then the output multilevel encoding sequence is used to generate a write signal for controlling the master disk recording; and Step 1504, the write signal is used to control the laser's output power, and then the multilevel RLL master disk is produced by recording the master disk.

In the aforementioned method for producing a multilevel read-only master, areas of the longitudinal sections of the recording pits of the multilevel read-only master disks and the multilevel read-only optical disks are defined by the following formula:

$$S = \int h(x)dx$$

where S represents the area of each of the longitudinal sections of the recording pits, x represents the coordinate value along the width direction of the recording pits, h(x) represents the pit-depth distribution function of the longitudinal sections of the recording pits and the region of the integration covers the whole longitudinal sections of the recording pits. For those skilled in the art, it should be understood that the pit-depth distribution function can be chosen arbitrarily, so the example for it is not described herein for the concision purpose.

In the aforementioned method for producing the multilevel read-only disk, when the semiconductor laser is used, the drive current of the laser is changed to control the magnitude of the recording laser power; when the gas laser is used, the modulation amplitude of the acousto-optic (or electro optic) modulator is changed to control the magnitude of the recording laser power.

In the aforementioned method for producing the multilevel read-only optical disk, the multilevel modulation codes are multilevel modulation codes, the multilevel sequence is a multilevel RLL sequence, and the multilevel read-only master is a multilevel run-length-limited read-only master.

In the aforementioned method for producing the multilevel read-only master disk, the run-length is controlled by adjusting the exposure time of the laser for recording the master.

In the aforementioned method for producing the multilevel read-only master disk, when semiconductor laser is used, the pulse width of the laser driver current is changed to adjust the exposure time of master recording; when gas laser is used, the modulation pulse width of the acousto-optic (or electro optic) modulator is changed to adjust the exposure time of master recording.

In the aforementioned method for producing produce the multilevel read-only master disk, the longitudinal sections of the pits along the radial direction have multistage shapes with an unfixed height, and the master is produced by the modified photo resist materials.

In the aforementioned method for producing the multilevel Read-only disk, the modified photo resist materials are obtained by changing the physical or chemical characteristics of the conventional photo resist materials which are used in master production, where physical character-change includes at least one of the following methods: heat treatment, optical treatment, electrical treatment and magnetic treatment, and where chemical character-change is realized by adding at least one of the following additive: initiator, sensitizer and resin.

In the aforementioned method for producing the multilevel read-only optical disk, the longitudinal sections of the marks in the radial direction are the longitudinal sections of the pits along the radial direction have a multistage with a fixed height, and the master is produced by the conventional photo resist material.

In the aforementioned method for producing the multilevel read-only master disk, the longitudinal sections of the pits along the radial direction have multilevel arbitrary shapes, and the master is produced by the resin material.

FIG. 16 shows a flow chart of a method for producing a multilevel read-only optical disk. The method comprises the following steps:

Step 1602, a binary user data is firstly encoded by the ECC encoder and multilevel run-length limited encoder to become a multilevel encoding sequence. Then the output multilevel sequence is used to generate a write signal for controlling the master recording;

Step 1604, using the write signal to control the laser's output power, and then producing a multilevel RLL read-only master by recording the master disk.

Step 1606, using the multilevel master disk as a mould to form a metallic stamper; and Step 1608, replicating a multilevel read-only optical disk by using the stamper as mould.

Comparing with the method shown in FIG. 15 and the method shown in FIG. 16, the difference between them lies in step 1606 and step 1608.

In the aforementioned method for producing a multilevel read-only optical disk, the areas of the longitudinal sections of the recording pits of the multilevel read-only master disks and the multilevel read-only optical disks are defined by the following formula:

$$S = \int h(x)dx$$

where S represents the area of each of the longitudinal sections of the recording pits, x represents the coordinate value along the width direction of the recording pits, h(x) represents the pit-depth distribution function of the longitudinal sections of the recording pits and the region of the integration covers the whole longitudinal sections of the recording pits. For those skilled in the art, it should be understood that the pit-depth distribution function can be chosen arbitrarily, so the example for it is not described in the present invention.

In the aforementioned method for producing a multilevel read-only optical disk, when the semiconductor laser is used, the drive current of the laser is changed to control the magnitude of the recording laser power; when the gas laser is used, the modulation amplitude of the acousto-optic (or electro optic) modulator is changed to control the magnitude of the recording laser power.

In the aforementioned method for producing a multilevel read-only optical disk, the multilevel modulation codes are multilevel modulation codes, the multilevel sequence is a multilevel RLL sequence, the multilevel read-only master is a multilevel run-length-limited read-only master and the multilevel read-only disks are multilevel run-length-limited read-only disk.

In the aforementioned method for producing a multilevel read-only optical disk, the run lengths is controlled by adjusting the exposure time of the laser for recording the master.

In the aforementioned method for producing a multilevel read-only disk, when semiconductor laser is used, the pulse width of the laser driver current is changed to adjust the exposure time of master recording; when gas laser is used, the modulation pulse width of the acousto-optic (or electro optic) modulator is changed to adjust the exposure time of master recording.

In the multilevel read-only optical disk, each of the longitudinal sections of the pits along the radial direction have a multistage trapezoid shape with an unfixed height and the modified photo resist is used for the master disks.

In the aforementioned method for producing a multilevel read-only optical disk, the modified photo resist materials are obtained by treating the conventional photo resist for making master with physical modification that can be performed by at least one selected from the group consisting of thermal treatment, optical treatment, electric treatment and magnetic treatment, or chemical modification that can be performed by adding at least one selected from the group consisting of an initiator, a sensibilizer and a resin as addition.

In the aforementioned method for producing a multilevel read-only optical disk, each of the longitudinal sections of the pits along the radial direction has a multistage trapezoid shape with a fixed height, and the master disk contains the conventional photo resist material.

In the aforementioned method for producing a multilevel read-only optical disk, each of the longitudinal sections of the pits along the radial direction has a multilevel arbitrary shape and the master disk contains a resin material.

In a summary, the present invention provides a multilevel run-length limited read-only optical disk or master and the method for producing the same, which combine the advantages of the multilevel technology and the RLL encoding technology. Such disk can remarkably increase the disk storage capacity and data transfer rate without changing the laser wavelength and the numerical aperture of the objective lens, and the biggest compatibility to the conventional read-only optical disks players is achieved. Adopting the RLL encoding technology can decrease the demand for the level number of the multilevel read-only optical disks, and it's advantageous to the reproduction of the ROM disk and the detection of the readout signals.

Furthermore, it should be understood for the persons skilled in the relevant art that when the present invention is used for producing a red laser optical disk, the track pitch of disk can be set to be no less than 0.52 μm, or can be set to be no less than 0.7 μm or higher, for example no less than 0.75 μm or 0.8 μm. However, when the present invention is used for producing a blue laser optical disk, the track pitch of disk can be set to be no more than 0.521 μm, or can be set to be no more than 0.5 μm or lower, for example no more than 0.45 μm or 0.41 μm.

It will be apparent to those skilled in the art, the term "optical disk" should include "son disk" (or optical disk) and "master disk". In the product claims, "optical disk" covers the "son disk" and the "master disk", because the "son disk" and the "master disk" needed to be protected have the same structure. However, in the method claims, the methods for producing "master disk" and "son disk" are different. The "master disk" should be produced prior to the production of the "son disk", the term "optical disk" means "son disk" in the method claims.

Moreover, it will be apparent to those skilled in the art, the present invention discloses many manufacturers and the model of the apparatuses or systems for realizing this invention, which do not limit the present invention. The present invention can be achieved by using the apparatuses or systems of different types or other manufacturers.

It will be apparent to those skilled in the art that various modification and variation can be made in the present invention without departing from the spirit or scope of the invention. Thus, it is intended that the present invention cover the modifications and variations of this invention provided they come within the scope of the appended claims and their equivalents.

What is claimed is:

1. A multilevel read-only optical disk, wherein run lengths of the multilevel read-only optical disk are limited, the multilevel read-only optical disk comprising a plurality of recording pits that have longitudinal sections, each of said longitudinal sections having a multilevel arbitrary shape and an area that is defined by the following formula:

$$S=\int h(x)dx$$

where S represents said area of each of the longitudinal sections of the recording pits, x represents the coordinate value along the width direction of the recording pit, h(x) represents the pit-depth distribution function of the longitudinal sections of the recording pits, and the area of the integration covers the whole longitudinal sections of the recording pits.

2. The multilevel read-only optical disk as recited in claim 1, wherein the area S of is defined by modulating the laser power for making master disk.

3. The multilevel read-only optical disk as recited in claim 1, wherein the run lengths of the multilevel read-only optical disk are limited by at least d 'zeros' and at most k 'zeros' between two nonzero digits in the channel sequences of the multilevel read-only optical disk, in which parameter d constrains the minimal value of run lengths appeared in data sequence while parameter k includes the maximal value of run lengths appeared in data sequence, and both k and d are integers and $k \geq d \geq 0$.

4. The multilevel read-only optical disk as recited in claim 1, wherein the depth of each of said recording pits varies as the number of levels of each of said recording pits.

5. The multilevel read-only optical disk as recited in claim 1, wherein the width of each of said recording pits varies as the number of levels of each of said recording pits.

6. The multilevel read-only optical disk as recited in claim 1, wherein the width of each of said recording pits varies as the number of levels of each of said recording pits and the depth of each of said recording pits varies as the number of levels of each of said recording pits.

7. The multilevel read-only optical disk as recited in any one of claims 4 to 6, wherein the depths and/or widths of the recording pits are defined by regulating the laser power for making master disk.

8. The multilevel read-only optical disk as recited in any one of claims 1 to 6, wherein each of the longitudinal sections of the pits along the width direction has a multistage trapezoidal shape with a fixed height, and a master disk for making the read-only optical disk includes a photo resist.

9. The multilevel read-only optical disk as recited in any one of claims 1 to 6, wherein each of the longitudinal sections of the pits along the width direction has a multistage trapezoidal shape with an unfixed height, and a master disk for making the read-only optical disk contains a modified photo resist.

10. The multilevel read-only optical disk as recited in claim 9, wherein the modified photo resist is obtained by treating the conventional photo resist for making master disk with physical modification that is performed by at least one selected from the group consisting of thermal treatment, optical treatment, electric treatment and magnetic treatment, or chemical modification that is performed by adding at least one selected from the group consisting of an initiator, a sensibilizer and a resin as an addition.

11. The multilevel read-only optical disk as recited in any one of claims 1 to 6, wherein each of the longitudinal sections of the pits along the width direction of the recording pits has a multilevel arbitrary shape and a master disk for making the read-only optical disk contains a resin.

12. The multilevel read-only optical disk as recited in any one of claims 1 to 6, wherein the run lengths of the multilevel read-only optical disk are limited by at least d 'zeros' and at most k 'zeros' between two nonzero digits in the channel sequences of the multilevel read-only optical disk, in which parameter d constrains the minimal value of run lengths appeared in data sequence while parameter k constrains the maximal value of run lengths appeared in data sequence, where both k and d are integers and $k \geq d \geq 0$.

13. A method for producing a multilevel read-only master disk, comprising the steps of:
   a) generating recording signals for controlling recording of the multilevel read-only master disk by encoding binary user data with error correction codes and multilevel modulation codes; and
   b) modulating a laser output power with the recording signals, then recording on the multilevel read-only master disk, and finally forming the multilevel read-only master disk, wherein the multilevel master disk comprises a plurality of recording pits that have longitudinal sections, each of said longitudinal sections having a multilevel arbitrary shape and an area that is defined by the following formula:

$$S=\int h(x)dx$$

where S represents said area of each of the longitudinal sections of the recording pits, x represents the coordinate value along the width direction of the recording pits, h(x) represents the pit-depth distribution function of the longitudinal sections of the recording pits, and the area of the integration covers the whole longitudinal sections of the recording pits; and further wherein the multilevel modulation codes are multilevel run-length-limited modulation codes; the multilevel codes sequences are multilevel run-length-limited modulation codes sequences; and the multilevel master disk is a multilevel run-length-limited master disk.

14. The method as recited in claim 13, wherein said area S of each of the longitudinal sections of the recording pits is defined by modulating the laser power for making the master disk; when the laser is a semiconductor laser, the recording laser power is modulated by changing the drive current of the semiconductor laser; when the laser is a gas laser, the recording laser power is modulated by changing the modulation amplitude of the acousto-optic modulator or the electro-optic modulator.

15. The method as recited in claim 13, wherein the run-length is defined by regulating the exposure time of the laser for recording the master disk; when the laser is a semiconductor laser, the exposure time for recording the master disk is regulated by changing the pulse width of the drive current of the semiconductor laser; when the laser is a gas laser, the exposure time for recording the master disk is regulated by changing the modulation pulse width of the acousto-optic modulator or the electro-optic modulator.

16. The method as recited in claim 13, wherein each of the longitudinal sections of the pits along the width direction has a multistage trapezoidal shape with an unfixed height, and the master disk contains a modified photo resist.

17. The method as recited in claim 16, wherein the modified photo resist is formed by treating the conventional photo resist for making master disk with physical modification that is performed by at least one selected from the group consisting of thermal treatment, optical treatment, electric treatment and magnetic treatment, or chemical modification that is performed by adding at least one selected from the group consisting of an initiator, a sensibilizer and a resin as an addition.

18. The method as recited in claim 13, wherein each of the longitudinal sections of the pits along the width direction has a multistage trapezoidal shape with a fixed height, and the master disk contains a photo resist.

19. The method as recited in claim 13, wherein each of the longitudinal sections of the pits along the radial direction has a multilevel arbitrary shape and the master disk contains a resin.

20. A method for producing a multilevel read-only optical disk, comprising the steps of:
   a) generating recording signals for controlling recording of a master disk by encoding binary user data with error correction and multilevel modulation;
   b) modulating the laser output power with the recording signals, recording the master disk, and forming the multilevel master disk;
   c) replicating a metallic stamper by using the multilevel master disk as a mould; and
   d) moulding the multilevel read-only optical disk with the metallic stamper, wherein the multilevel read-only optical disk comprises a plurality of the recording pits that have longitudinal sections, each of said longitudinal sections having a multilevel arbitrary shape and an area that is defined by the following formula:

$$S=\int h(x)dx$$

where S represents the area of each of the longitudinal sections of the recording pits, x represents the coordinate value along the width direction of the recording pits, h(x) represents the pit-depth distribution function of the longitudinal sections of the recording pits and the region of the integration covers the whole longitudinal sections of the recording pits; and further wherein the multilevel modulation codes are multilevel run-length-limited modulation codes; the multilevel codes sequences are multilevel run-length-limited modulation codes sequences; the multilevel read-only master disk is a multilevel run-length-limited master disk; the multilevel read-only optical disk is a multilevel run-length-limited optical disk.

21. The method as recited in claim 20, wherein the area S of each of the longitudinal sections of the recording pits is defined by modulating the laser power for making master disk; when the laser is a semiconductor laser, the recording laser power is modulated by changing the drive current of the semiconductor laser; when the laser is a gas laser, the recording laser power is modulated by changing the modulation amplitude of the acousto-optic modulator or the electro-optic modulator.

22. The method as recited in claim 20, wherein the run-length is defined by regulating the exposure time of the laser for recording the master disk, when the laser is a semiconductor laser, the exposure time for recording the master disk is regulated by changing the pulse width of the drive current of the semiconductor laser; when the laser is a gas laser, the exposure time for recording the master is regulated by changing the modulation pulse width of the acousto-optic modulator or the electro-optic modulator.

23. The method as recited in claim 20, wherein each of the longitudinal sections of the pits along the width direction has a multistage trapezoid shape with an unfixed height, and the master disk contains a modified photo resist.

24. The method as recited in claim 23, wherein the modified photo resist is obtained by treating the conventional photo resist for making master with physical modification that can be performed by at least one selected from the group consisting of thermal treatment, optical treatment, electric treatment and magnetic treatment, or chemical modification that can be performed by adding at least one selected from the group consisting of an initiator, a sensibilizer and a resin as an addition.

25. The method as recited in claim 20, wherein each of the longitudinal sections of the pits along the width direction has a multistage trapezoidal shape with a fixed height, and the master disk contains a photo resist.

26. The method as recited in claim 20, wherein each of the longitudinal sections of the pits along the radial direction has a multilevel arbitrary shape and the master disk contains a resin.

* * * * *

UNITED STATES PATENT AND TRADEMARK OFFICE
CERTIFICATE OF CORRECTION

PATENT NO. : 7,680,024 B2  Page 1 of 1
APPLICATION NO. : 11/102567
DATED : March 16, 2010
INVENTOR(S) : Xu et al.

It is certified that error appears in the above-identified patent and that said Letters Patent is hereby corrected as shown below:

On the Title Page, in Item (73), in "Assignee" delete "Shanghai Xiangzhang Electronics Co., Ltd., Songjiang, Shanghai (CN)" and insert -- Assignees: Tsinghua University, Beijing (CN) and Shanghai Xiangzhang Electronics Co., Ltd., Songjiang, Shanghai (CN) --

Signed and Sealed this

Ninth Day of November, 2010

David J. Kappos
*Director of the United States Patent and Trademark Office*